(12) United States Patent
Lee

(10) Patent No.: US 11,965,481 B2
(45) Date of Patent: Apr. 23, 2024

(54) WIND POWER SYSTEM

(71) Applicant: CAFE24 CORP., Seoul (KR)

(72) Inventor: Jae Suk Lee, Seoul (KR)

(73) Assignee: CAFE24 CORP., Seoul (KR)

( * ) Notice: Subject to any disclaimer, the term of this patent is extended or adjusted under 35 U.S.C. 154(b) by 49 days.

(21) Appl. No.: 17/779,574

(22) PCT Filed: May 26, 2020

(86) PCT No.: PCT/KR2020/015025
§ 371 (c)(1),
(2) Date: May 25, 2022

(87) PCT Pub. No.: WO2021/107424
PCT Pub. Date: Jun. 3, 2021

(65) Prior Publication Data
US 2022/0412304 A1 Dec. 29, 2022

(30) Foreign Application Priority Data

Nov. 26, 2019 (KR) .......................... 10-2019-0152863
Apr. 14, 2020 (KR) .......................... 10-2020-0045176
Apr. 14, 2020 (KR) .......................... 10-2020-0045177

(51) Int. Cl.
F03D 5/02 (2006.01)
F03D 15/00 (2016.01)
H02K 7/00 (2006.01)
H02K 7/18 (2006.01)

(52) U.S. Cl.
CPC .............. F03D 5/02 (2013.01); F03D 15/00 (2016.05); H02K 7/003 (2013.01); H02K 7/183 (2013.01); F05B 2220/706 (2013.01); F05B 2240/31 (2013.01)

(58) Field of Classification Search
CPC ........... F03D 5/02; F03D 15/00; H02K 7/003; H02K 7/183
See application file for complete search history.

(56) References Cited

U.S. PATENT DOCUMENTS 4,589,344 A  5/1986 Davison
4,756,666 A  7/1988 Labrador
(Continued)

FOREIGN PATENT DOCUMENTS

EP   1331391 A1   7/2003
JP   S58120880 U  8/1983
(Continued)

OTHER PUBLICATIONS

English Translation of JP 2015-040486 A (Year: 2012).*

Primary Examiner — Sean Gugger
(74) Attorney, Agent, or Firm — INVENSTONE PATENT, LLC

(57) ABSTRACT

Provided is a wind power system. The wind power system may comprise: a rail for providing a movement path in a horizontal direction; a moving body configured to slide and move along the movement path of the rail; a plurality of blades installed on the moving body and providing power for the movement of the moving body on the basis of energy from the wind; and a nacelle having a generator for generating power by rotating in conjunction with the movement of at least one of the moving body and the blades.

17 Claims, 23 Drawing Sheets

(56) References Cited

U.S. PATENT DOCUMENTS

| | | | |
|---|---|---|---|
| 2003/0160458 A1* | 8/2003 | Lee | F03D 5/04 |
| | | | 290/55 |
| 2011/0309634 A1 | 12/2011 | Syrovy | |
| 2012/0068466 A1* | 3/2012 | Gilbert | F24F 7/025 |
| | | | 290/55 |
| 2012/0261926 A1* | 10/2012 | Van Den Bulcke | F03D 9/35 |
| | | | 290/55 |
| 2015/0240781 A1* | 8/2015 | Yan | F03D 5/04 |
| | | | 290/55 |
| 2016/0290317 A1 | 10/2016 | Davison et al. | |
| 2018/0020433 A1* | 1/2018 | Lee | H04J 11/0026 |
| 2019/0186461 A1* | 6/2019 | Bahnmüller | F03D 3/068 |

FOREIGN PATENT DOCUMENTS

| | | |
|---|---|---|
| JP | 2003206847 A | 7/2003 |
| JP | 2008-075486 A | 4/2008 |
| JP | 2015-040486 A | 3/2015 |
| JP | 2017-145733 A | 8/2017 |
| KR | 10-2003-0035743 A | 5/2003 |
| KR | 10-2015-0100499 A | 9/2015 |
| WO | 2018217127 A1 | 11/2018 |

\* cited by examiner

WIND POWER SYSTEM

CROSS-REFERENCE TO RELATED APPLICATIONS

This application is a National Stage filing under 35 U.S.C. 371 of International Application No. PCT/KR2020/015025, filed on May 26, 2020, which claims the benefit of earlier filing date and right of priority to Korean Application No. 10-2019-0152863, filed on Nov. 26, 2019 and Korean Application No. 10-2020-0045176, filed on Apr. 14, 2020, and Korean Application No. 10-2020-0045177, filed on Apr. 14, 2020 in the Korean Intellectual Property Office, the contents of which are all hereby incorporated by reference herein in their entirety.

BACKGROUND OF THE DISCLOSURE

Technical Field

The present disclosure relates to a power system, and more particularly, to a wind power system including a plurality of blades.

Background Art

A wind power generator is a device that converts wind energy into electrical energy. Wind causes the blades of the wind power generator to rotate. Electricity may be generated from the rotary force of the blades produced when the wind rotates the blades then. Specifically, the wind power generator may be configured of three parts: blades, a transmission device, and a generator. A blade is a device that is rotated by the wind and converts wind energy into mechanical energy. A generator is a device that converts mechanical energy generated by the blades into electrical energy.

Such wind power generation is attracting attention as a new renewable energy to replace conventional fossil fuels. However, in the case of a rotor blade type wind power generator of a conventional configuration, it is necessary to enlarge a rotor blade to obtain greater electrical energy, whereas the enlargement of the rotor blade causes ambient noise.

SUMMARY OF THE DISCLOSURE

An aspect of the present disclosure is directed to providing a wind power system configured to rotate a rotary shaft of a generator using the movement of a plurality of blades and/or a moving body that move(s) along the movement path provided by a rail, thereby addressing an issue associated with noise generation caused by the rotation of a conventional large rotor blade.

However, the aspect of the present disclosure is not limited to the aspect described above and may be diversely expanded without departing from the spirit and scope of the present disclosure.

A wind power system according to an embodiment of the present disclosure may include: a rail for providing a movement path in a horizontal direction; a moving body configured to slide and move along the movement path of the rail; a plurality of blades installed on the moving body and providing power for movement of the moving body based on energy from wind; and a nacelle having a generator for generating power by rotating in conjunction with the movement of at least one of the moving body and the blades.

According to an aspect, the generator may have a generator central rotary shaft and a circular toothed gear coupled to the generator central rotary shaft, a plurality of toothed threads may be provided on a surface facing the generator of at least one of the moving body and the blades, and the generator central rotary shaft may be configured to rotate as the toothed threads move in engagement with the circular toothed gear according to the movement of at least one of the moving body and the blades.

According to an aspect, the wind power system may further include a power transfer shaft that rotates in conjunction with the movement of at least one of the moving body and the blades, and a rotation pulley provided on the power transfer shaft and a rotation pulley provided on the generator central rotary shaft of the generator may be configured to rotate in conjunction with a rotating belt.

According to an aspect, the rail may form a loop, and each of the plurality of blades may be configured to adaptively rotate to maximize power in a target movement direction based on information on a wind direction and information on the target movement direction determined according to a position of each of the plurality of blades in the loop.

According to an aspect, rotation of each of the plurality of blades may be performed based on a rotary shaft perpendicular to the ground.

According to an aspect, the rail may form a loop, and each of the plurality of blades may be configured of a flexible material and have a plurality of air pockets, and may be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

According to an aspect, the information on a position of each of the plurality of blades in the loop may be acquired by receiving a position identification signal from at least one of a position identification signal generation device provided in a plural number in the loop by a position signal reception device provided in each of the plurality of blades.

According to an aspect, the information on a wind direction may be acquired from a wind direction sensor provided in each of the plurality of blades.

According to an aspect, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction.

According to an aspect, each of the plurality of blades may have a first partial blade and a second partial blade divided in a height direction, the first partial blade and the second partial blade may be configured to be rotatable independently of each other, and the first partial blade and the second partial blade may be configured to adaptively rotate to maximize power in each of the target movement direction based on information on a wind direction at each arranged height.

According to an aspect, the loop formed by the rail may include: a first portion for providing a movement path in a first direction; a second portion for providing a movement path in a second direction opposite to the first direction; a first joint portion for providing a movement path from the first portion to the second portion; and a second joint portion for providing a movement path from the second portion to the first portion.

According to an aspect, the wind power system may further include an inner loop formed inside the loop to provide a shorter movement path than the loop, wherein the generator may be configured to have a predetermined target rotation speed, and may be configured to rotate in conjunction with the movement of at least one of the moving body and the blades of any one of the loop and the inner loop to achieve a rotation speed closer to the target rotation speed based on information on a wind speed.

According to an aspect, the information on a wind speed may be acquired from a wind speed sensor.

According to an aspect, each of the plurality of blades may be configured such that an installation position with respect to the moving body may be changed.

According to an aspect, the rail may include a straight section and a curved section, and the plurality of blades may be arranged at narrower intervals when positioned in the curved section than when positioned in the straight section.

According to an aspect, the wind power system may further include: a housing unit in which the plurality of blades are housed; a junction included in the rail; and a housing rail for providing a movement path from the junction to the housing unit, wherein the plurality of blades may be configured to be housed in the housing unit via the junction and the housing rail.

According to an aspect, the wind power system may further include a housing unit configured to pass through the rail, and the plurality of blades may be configured to be housed in the housing unit by moving along the rail.

According to an aspect, each of the plurality of blades may include a fastening unit for coupling with an adjacent blade when an interval between the plurality of blades is minimized by changing an installation position with respect to the moving body.

According to an aspect, the plurality of blades may include a first blade positioned on a leftmost side and a second blade positioned on a rightmost side when an interval between the plurality of blades is minimized through a change in installation position with respect to the moving body, wherein the first blade and the second blade may each have a fastening unit, and the plurality of blades may be coupled by the fastening unit of the first blade and the fastening unit of the second blade that are fastened to each other.

According to an aspect, each of the plurality of blades may be configured to be foldable toward a ground direction.

A wind power system according to an embodiment of the present disclosure may include: a rail for providing a movement path in a horizontal direction; a plurality of moving bodies configured to slide and move along the movement path of the rail, wherein each of the plurality of moving bodies includes a blade installed on each of the plurality of moving bodies and provides power for the movement of each of the plurality of moving bodies on the basis of energy from the wind; a coupling body fastened to an upper end of a blade provided in each of the plurality of moving bodies and moving based on power provided by the blade; and a nacelle having a generator for generating power by rotating in conjunction with the movement of the coupling body.

According to an aspect, the generator may have a generator central rotary shaft and a circular toothed gear coupled to the generator central rotary shaft, a plurality of toothed threads may be provided on a surface facing the generator of the coupling body, and the generator central rotary shaft may be configured to rotate as the toothed threads move in engagement with the circular toothed gear according to the movement of the coupling body.

According to an aspect, the wind power system may further include a power transfer shaft that rotates in conjunction with the movement of the coupling body, and a rotation pulley provided on the power transfer shaft and a rotation pulley provided on the generator central rotary shaft of the generator may be configured to rotate in conjunction with a rotating belt.

According to an aspect, the rail may form a loop, and each of the plurality of blades may be configured to adaptively rotate to maximize power in a target movement direction based on information on a wind direction and information on the target movement direction determined according to a position of each of the plurality of blades in the loop.

According to an aspect, rotation of each of the plurality of blades may be performed based on a rotary shaft perpendicular to the ground.

According to an aspect, the rail may form a loop, and each of the plurality of blades may be configured of a flexible material and have a plurality of air pockets, and may be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

According to an aspect, the information on a position of each of the plurality of blades in the loop may be acquired by receiving a position identification signal from at least one of a position identification signal generation device provided in a plural number in the loop by a position signal reception device provided in each of the plurality of blades.

According to an aspect, the information on a wind direction may be acquired from a wind direction sensor provided in each of the plurality of blades.

According to an aspect, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction.

According to an aspect, each of the plurality of blades may have a first partial blade and a second partial blade divided in a height direction, the first partial blade and the second partial blade may be configured to be rotatable independently of each other, and the first partial blade and the second partial blade may be configured to adaptively rotate to maximize power in each of the target movement direction based on information on a wind direction at each arranged height.

According to an aspect, the loop formed by the rail may include: a first portion for providing a movement path in a first direction; a second portion for providing a movement path in a second direction opposite to the first direction; a first joint portion for providing a movement path from the first portion to the second portion; and a second joint portion for providing a movement path from the second portion to the first portion.

According to an aspect, the wind power system may further include an inner loop formed inside the loop to provide a shorter movement path than the loop, wherein the generator may be configured to have a predetermined target rotation speed, and may be configured to rotate in conjunction with the movement of the coupling body of any one of the loop and the inner loop to achieve a rotation speed closer to the target rotation speed based on information on a wind speed.

According to an aspect, the information on a wind speed may be acquired from a wind speed sensor.

According to an aspect, the coupling body and each of the plurality of blades may be movably fastened to adjust an interval between the plurality of blades.

According to an aspect, the rail may include a straight section and a curved section, and the plurality of blades may be arranged at narrower intervals when positioned in the curved section than when positioned in the straight section.

According to an aspect, the wind power system may further include: a housing unit in which the plurality of blades are housed; a junction included in the rail; and a housing rail for providing a movement path from the junction to the housing unit, wherein the plurality of blades may be configured to be housed in the housing unit via the junction and the housing rail.

According to an aspect, the wind power system may further include a housing unit configured to pass through the rail, and the plurality of blades may be configured to be housed in the housing unit by moving along the rail.

According to an aspect, each of the plurality of blades may include a fastening unit for coupling with an adjacent blade when an interval between the plurality of blades is minimized by changing an installation position with respect to the moving body.

According to an aspect, the plurality of blades may include a first blade positioned on a leftmost side and a second blade positioned on a rightmost side when an interval between the plurality of blades is minimized through a change in installation position with respect to the moving body.

According to an aspect, the first blade and the second blade may each have a fastening unit, and the plurality of blades may be coupled by the fastening unit of the first blade and the fastening unit of the second blade that are fastened to each other.

According to an aspect, the blade may have a horizontal length of 90 m and a vertical height of 120 m.

According to an aspect, the generator may be configured to rotate in conjunction with the movement of any one coupling body of the loop and the inner loop so that the moving speed of each of the moving bodies approaches 1.9 m/s.

A wind power system according to an embodiment of the present disclosure may include: a rail for providing a movement path in a horizontal direction; a plurality of moving bodies configured to slide and move along the movement path of the rail, wherein each of the plurality of moving bodies includes a blade installed on each of the plurality of moving bodies and provides power for the movement of each of the plurality of moving bodies on the basis of energy from the wind; and a nacelle having a generator for generating power by rotating in conjunction with the movement of the plurality of moving bodies.

According to an aspect, the generator may have a generator central rotary shaft and a circular toothed gear coupled to the generator central rotary shaft, a power transfer rod may be provided on a surface facing the generator of each of the plurality of moving bodies, and the generator central rotary shaft may be configured to rotate as the power transfer rod acts on gear toothed thread of the circular toothed gear according to the movement of the plurality of moving bodies.

According to an aspect, the wind power system may further include a power transfer shaft that rotates in conjunction with the movement of the plurality of moving bodies, and a rotation pulley provided on the power transfer shaft and a rotation pulley provided on the generator central rotary shaft of the generator may be configured to rotate in conjunction with a rotating belt.

According to an aspect, the rail may form a loop, and each of the plurality of blades may be configured to adaptively rotate to maximize power in a target movement direction based on information on a wind direction and information on the target movement direction determined according to a position of each of the plurality of blades in the loop.

According to an aspect, rotation of each of the plurality of blades may be performed based on a rotary shaft perpendicular to the ground.

According to an aspect, the rail may form a loop, and each of the plurality of blades may be configured of a flexible material and have a plurality of air pockets, and may be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

According to an aspect, the information on a position of each of the plurality of blades in the loop may be acquired by receiving a position identification signal from at least one of a position identification signal generation device provided in a plural number in the loop by a position signal reception device provided in each of the plurality of blades.

According to an aspect, the information on a wind direction may be acquired from a wind direction sensor provided in each of the plurality of blades.

According to an aspect, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction.

According to an aspect, each of the plurality of blades may have a first partial blade and a second partial blade divided in a height direction, the first partial blade and the second partial blade may be configured to be rotatable independently of each other, and the first partial blade and the second partial blade may be configured to adaptively rotate to maximize power in each of the target movement direction based on information on a wind direction at each arranged height.

According to an aspect, the loop formed by the rail may include: a first portion for providing a movement path in a first direction; a second portion for providing a movement path in a second direction opposite to the first direction; a first joint portion for providing a movement path from the first portion to the second portion; and a second joint portion for providing a movement path from the second portion to the first portion.

According to an aspect, the wind power system may further include: a housing unit in which the plurality of moving bodies are housed; a junction included in the rail; and a housing rail for providing a movement path from the junction to the housing unit, wherein the plurality of moving bodies may be configured to be housed in the housing unit via the junction and the housing rail.

According to an aspect, the wind power system may further include a housing unit configured to pass through the rail, and the plurality of moving bodies may be configured to be housed in the housing unit by moving along the rail.

According to an aspect, each of the plurality of blades may include a fastening unit for coupling with an adjacent blade when an interval between the plurality of blades is minimized according to the movement of the plurality of moving bodies.

According to an aspect, the plurality of blades may include a first blade positioned on a leftmost side and a second blade positioned on a rightmost side when an interval between the plurality of blades is minimized according to the movement of the plurality of moving bodies, wherein the first blade and the second blade may each have a fastening unit, and the plurality of blades may be coupled by the fastening unit of the first blade and the fastening unit of the second blade that are fastened to each other.

According to an aspect, each of the plurality of blades may be configured to be foldable toward a ground direction.

According to an aspect, the blade may have a horizontal length of 90 m and a vertical height of 120 m.

According to an aspect, each of the plurality of blades may be configured to adaptively rotate so that the moving speed of each of the moving bodies approaches 1.9 m/s.

The disclosed technology can have the following effects. However, it does not mean that a specific exemplary embodiment should include the entire following effects or should include only the following effects, and it should not be understood that the scope of the right of disclosed technology is limited thereto.

According to a wind power system according to an embodiment of the present disclosure, the wind power system is configured to rotate a rotary shaft of a generator using the movement of a plurality of blades and/or a moving body that move(s) along the movement path provided by a rail, thereby addressing an issue associated with noise generation caused by the rotation of a conventional large rotor blade.

In addition, in configuring a wind farm capable of producing a large amount of power, space efficiency can be increased compared to a conventional rotor blade type wind power generator, and construction costs can also be reduced.

In addition, by configuring the blade to be rotatable adaptively to a wind direction, it is possible to produce power with high efficiency regardless of changes in weather conditions.

DETAILED DESCRIPTION OF THE DISCLOSURE

Figure 1:
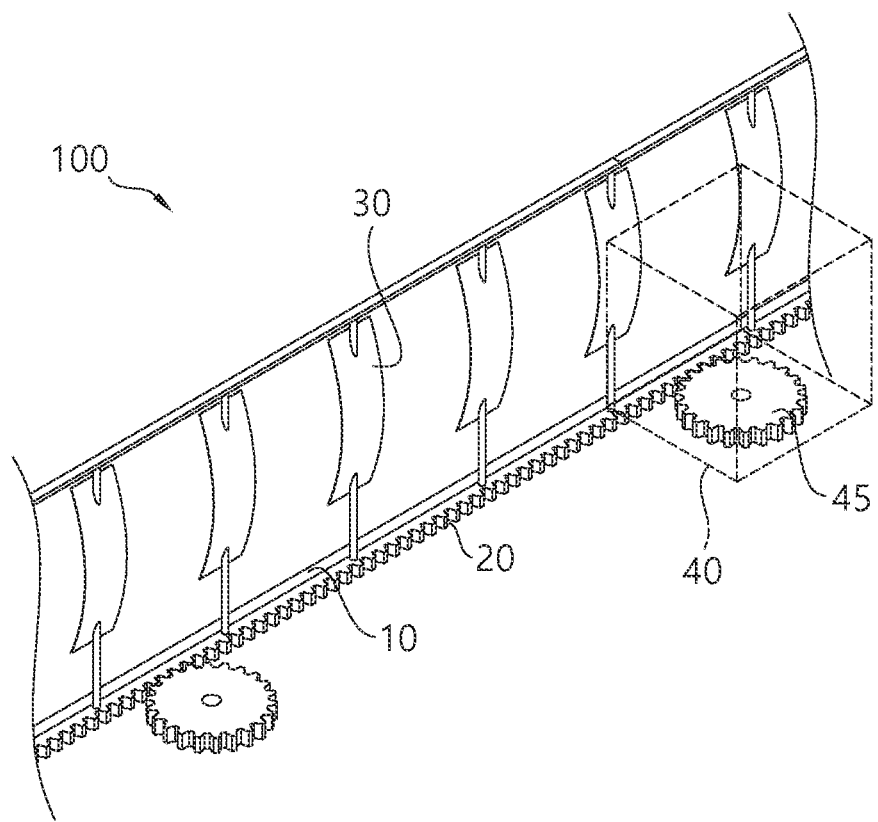
FIG. 1 is a conceptual view of a wind power system according to an embodiment of the present disclosure.

The present disclosure may be variously modified and have various types, and specific embodiments thereof will be illustrated in the drawings and described in detail in the detailed description.

However, this is not intended to limit the present disclosure to specific embodiments, and it should be understood that all modifications, equivalents and substitutes included in the spirit and technical scope of the present disclosure are included.

Terms such as "first" and "second" may be used to describe various components, but the components are not restricted by the terms. The terms are used only to distinguish one component from another component. For example, a first component may be named a second component without departing from the scope of the right of the present disclosure. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

The terms used in the present specification are merely used to describe specific embodiments and are not intended to limit the present disclosure. A singular expression includes a plural expression, unless the context clearly states otherwise. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Unless otherwise defined, all terms including technical and scientific terms used herein have the same meaning as commonly understood by those skilled in the technical field to which the present disclosure pertains. It will be understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings. In describing the present disclosure, in order to facilitate the overall understanding, the same reference numerals are used to designate the same components throughout the drawings, and repeated descriptions of the same components will be omitted.

As described above, such wind power generation is attracting attention as a new renewable energy to replace conventional fossil fuels. However, in the case of a rotor blade type wind power generator of a conventional configuration, it is necessary to enlarge a rotor blade to obtain greater electrical energy, whereas the enlargement of the rotor blade causes ambient noise. In order to minimize the damage caused by rotational noise, attempts have been made to change the installation position of a wind power generator to the sea. However, in the case of offshore installation, there is an issue that the economic feasibility, which is an advantage of wind power generation, is rather deteriorated due to an increase in the construction cost, and it may also cause a big issue in the environmental aspect.

The present disclosure is directed to addressing an issue as above. The wind power system according to an embodiment of the present disclosure is configured to rotate a rotary shaft of a generator using the movement of a plurality of blades and/or a moving body that move(s) along the movement path provided by a rail, thereby addressing an issue associated with noise generation caused by the rotation of a conventional large rotor blade. Hereinafter, the wind power system according to an embodiment of the present disclosure will be described in more detail with reference to the drawings.

First Embodiment

Figure 2:
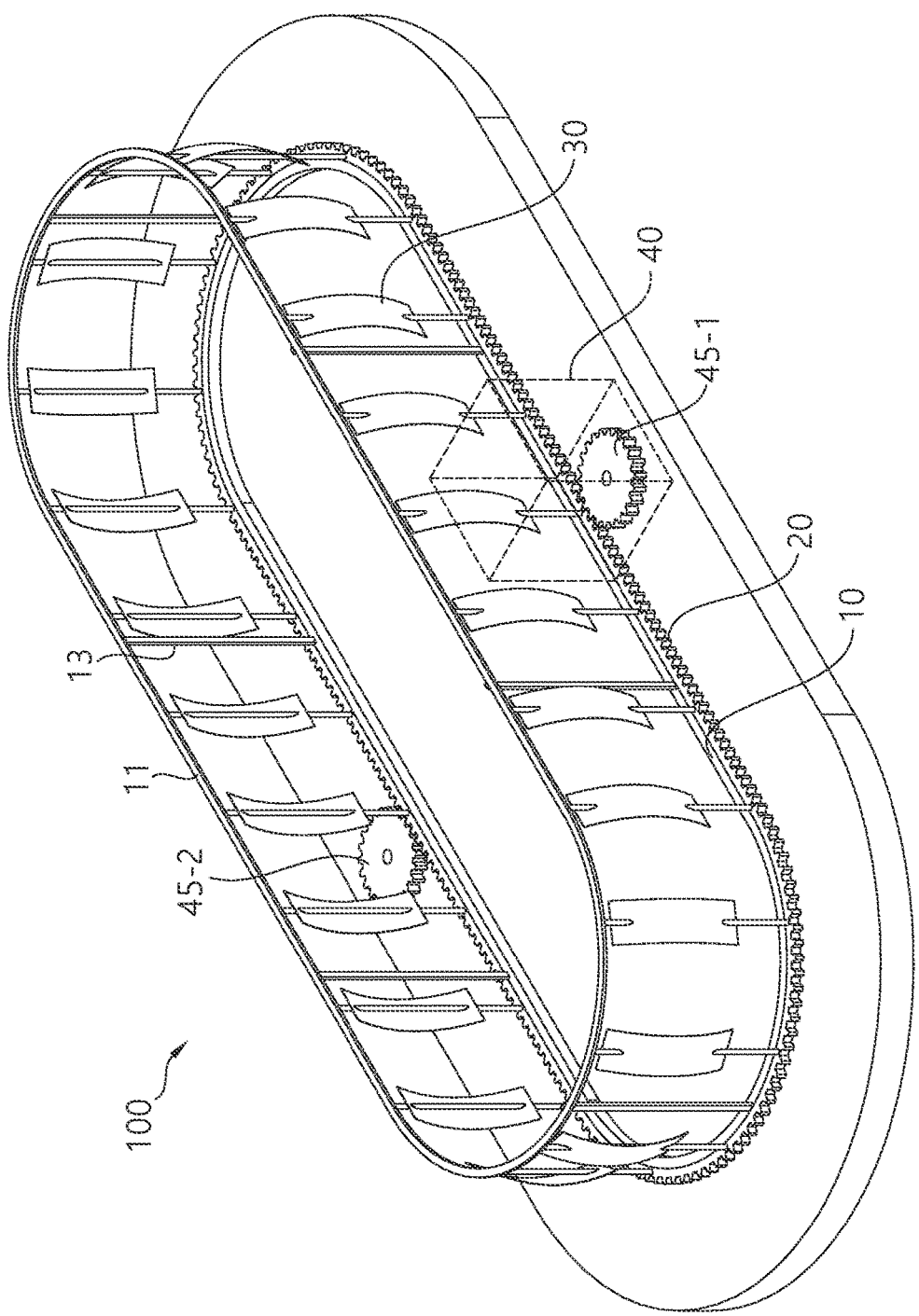
FIG. 2 is a perspective view of a loop-type wind power system according to an embodiment of the present disclosure.

FIG. 1 is a conceptual view of a wind power system according to an embodiment of the present disclosure. FIG. 2 is a perspective view of a loop-type wind power system according to an embodiment of the present disclosure. As illustrated in FIG. 1 or 2, a wind power system 100 according to an embodiment of the present disclosure may include a rail 10, a moving body 20, a plurality of blades 30, and a nacelle 40 having a generator.

The rail 10 may provide a movement path through which the moving body 20 and/or the plurality of blades 30 slide and move. In the embodiment illustrated through FIG. 1, the rail 10 is exemplified as providing a movement path from the side surface of the moving body 20, but the rail 10 may have various design forms that may provide a movement path through which the moving body 20 and/or the plurality of blades 30 may slide and move. For example, a form such as a train rail or a mono rail may be employed. As illustrated in FIG. 1, the rail 10 according to an embodiment of the present disclosure may be installed on the ground or installed through a support to provide a movement path in a horizontal direction of the moving body 20 and/or the plurality of blades 30.

The moving body 20 may be configured to slide and move along the movement path provided by the rail 10, and the plurality of blades 30 may be installed on the moving body to provide power for movement of the moving body 20 based on energy from wind. In other words, when the wind blows, the energy provided by the wind acts on the blades 30, and the blades 30 and the moving body 20 to which the blades are connected are configured to move. In the embodiment illustrated in FIG. 1, it is exemplified that the moving body 20 contacts the rail 10 and the plurality of blades 30 are installed on the moving body 20, but the installation form and structure of the rail 10, the moving body 20, and the blades 30 may be employed in various modifications. For example, in an aspect, each of the blades 30 may be configured to be slidably movable on the rail 10, and the moving body 20 may also function as a configuration connecting the plurality of blades 30. In an aspect, the moving body 20 may also be integrally formed as illustrated in FIG. 1, and in another aspect, the moving body 20 may be in the form of a chain having a plurality of segment structures. Further, according to the embodiment, the moving body 20 may be configured of a flexible material.

Referring back to FIG. 1, the nacelle 40 having a generator may be arranged to be adjacent to the moving body 20 and/or the blades 30. According to an aspect, the generator may be a generator that generates power according to the rotation of a generator central shaft gear 45 coupled to a generator central rotary shaft, and the central rotary shaft of the generator may be configured to rotate in conjunction with the movement of at least one of the moving body 20 and the blades 30. FIG. 1 illustrates a configuration in which the generator central rotary shaft rotates in conjunction with the movement of the moving body 20.

Figure 3:
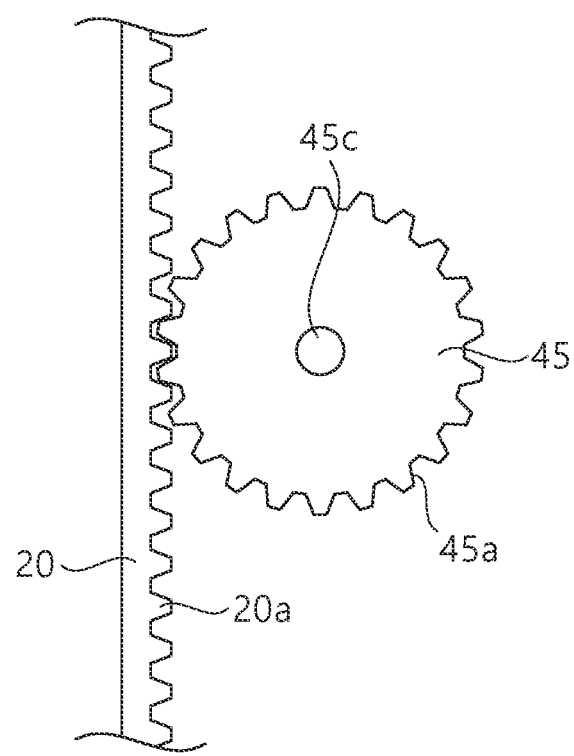
FIG. 3 illustrates a power transfer structure between a blade and/or a moving body and a generator central rotary shaft according to a first aspect.
Figure 4:
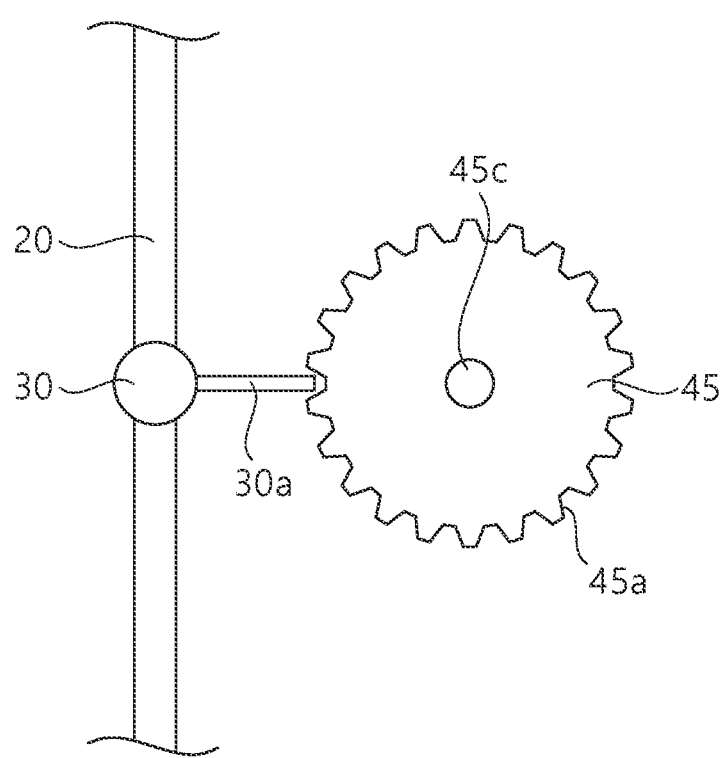
FIG. 4 illustrates a power transfer structure between a blade and/or a moving body and a generator central rotary shaft according to a second aspect.

In this regard, FIG. 3 illustrates a power transfer structure between a blade and/or a moving body and a generator central rotary shaft according to a first aspect. FIG. 4 illustrates a power transfer structure between a blade and/or a moving body and a generator central rotary shaft according to a second aspect.

As illustrated in FIG. 3, the generator may have a generator central rotary shaft 45*c* and a circular toothed gear 45 coupled to the generator central rotary shaft 45*c*, a plurality of toothed threads 20*a* may be provided on a surface facing the generator of at least one of the moving body 20 and the blades 30, and the generator central rotary shaft 45*c* may be configured to rotate as the toothed threads 20*a* move in engagement with gear toothed threads 45*a* of the circular toothed gear 45 according to the movement of at least one of the moving body 20 and the blades 30. Although FIG. 3 exemplarily illustrates that the toothed threads 20*a* are provided on the moving body 20, the toothed threads 20*a* may also be provided on a surface facing the generator of the blades 30.

Alternatively, as illustrated in FIG. 4, for example, a blade power transfer rod 30a may be provided on a side facing the generator of the blades 30, and the generator central rotary shaft 45c may be configured to rotate by acting on the gear toothed threads 45a formed in the generator central shaft gear 45 while the blade power transfer rod 30a moves. Unlike that illustrated in FIG. 4, a power transfer rod may be provided at a predetermined interval on a side facing the generator of the moving body 20 and may be configured to induce rotation of the central rotary shaft 45c.

Figure 12:
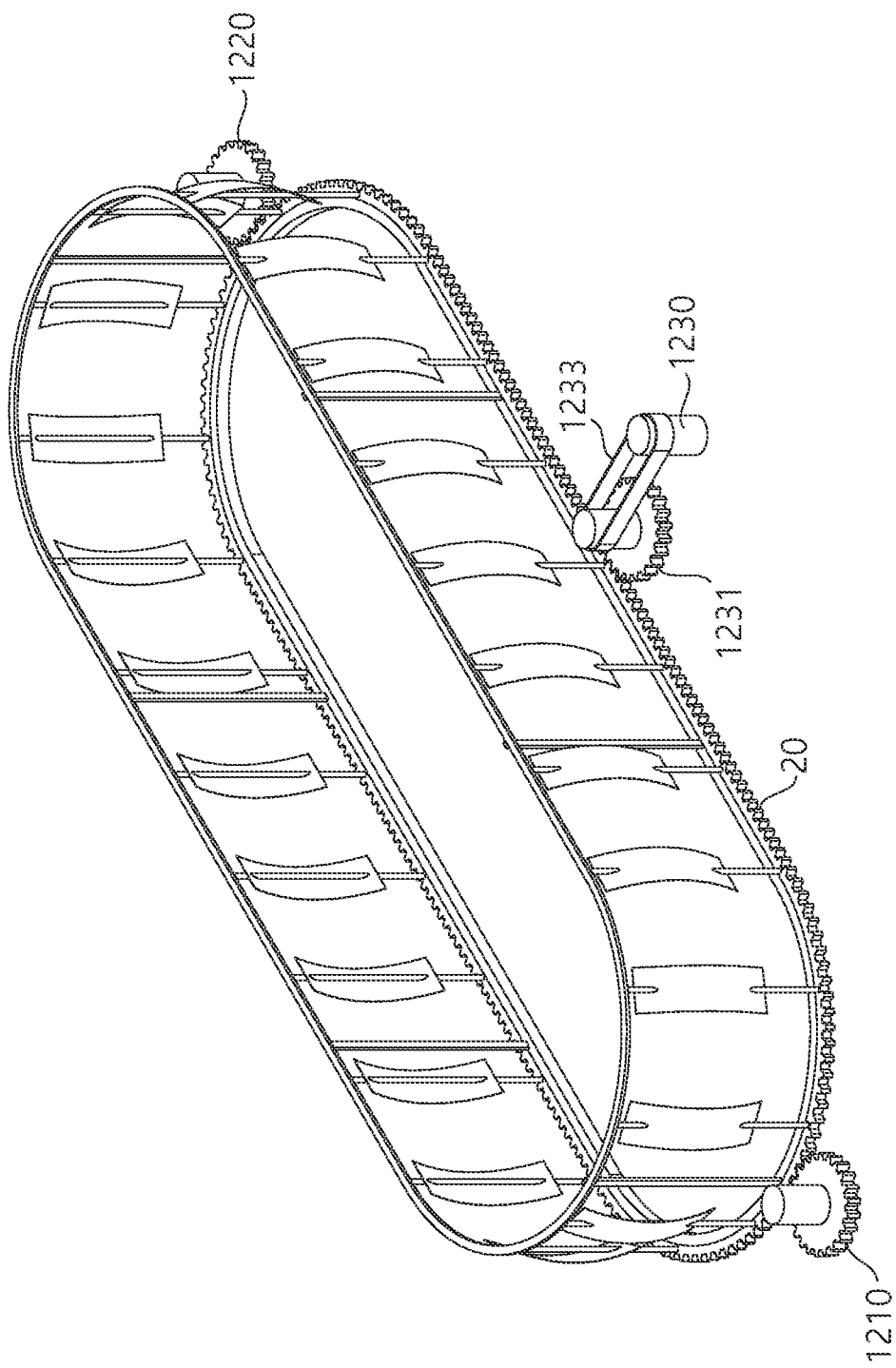
FIG. 12 is an exemplary view of the arrangement of a generator central rotary shaft.

FIG. 12 is an exemplary view of the arrangement of a generator central rotary shaft. As illustrated in FIG. 12, the generator central shaft may have various embodiments in relation to the rail. According to an aspect, in an embodiment in which the rail 10 and the moving body 20 form a loop as illustrated in FIG. 2 or FIG. 12, generator central rotary shafts 1210 and 1220 may also be positioned outside the loop, and may also be positioned inside the loop. In addition, the rotation of the generator central rotary shafts 1210 and 1220 may also directly conjunct with the movement of the moving body and/or the blades, and may also be configured to rotate in conjunction with a medium unit such as a generator central rotary shaft 1230. As illustrated in FIG. 12, the wind power system according to an embodiment of the present disclosure may further include a power transfer shaft 1231 that rotates in conjunction with the movement of at least one of the moving body 20 and the blades 30, and a rotation pulley provided on the power transfer shaft 1231 and a rotation pulley provided on the generator central rotary shaft 1230 of the generator may also be configured to rotate in conjunction with a rotating belt 1233. The rotating belt 1233 may also be configured, for example, in the form of a conveyor belt or chain.

Referring back to FIG. 2, in the wind power system according to an embodiment of the present disclosure, the rail 10 may be configured to form a loop. According to an aspect, the rail 10 may further include an upper frame 11 supported by a plurality of upper frame supports 13, wherein the upper frame 11 may be configured to maintain an upper portion of the blade 30 movably to improve the standing stability of the blades 30.

Since the rail 10 is formed as a loop, the movement path of the plurality of blades and/or the moving body may have a circulating structure. Herein, each of the plurality of blades 30 may be configured to adaptively rotate to maximize power in a target movement direction based on information on a wind direction and information on the target movement direction determined according to a position of each of the plurality of blades 30 in the loop.

According to another aspect, each of the plurality of blades 30 may be configured of a flexible material and have a plurality of air pockets, and may also be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

Figure 10:
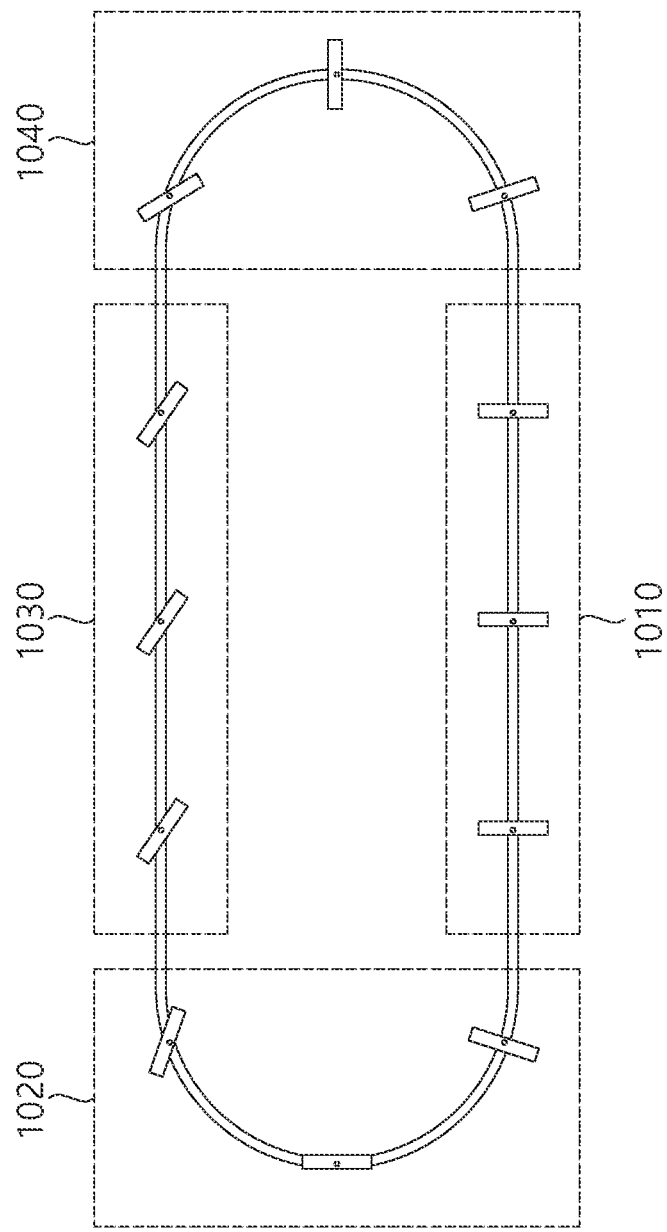
FIG. 10 is a top view of a wind power system according to an aspect.

The target movement direction will be described in more detail with reference to FIG. 10. FIG. 10 is a top view of a wind power system according to an aspect. As illustrated in FIG. 10, according to an embodiment of the present disclosure, the loop formed by the rail 10 may include, for example: a first portion 1010 for providing a movement path in a first direction; a second portion 1030 for providing a movement path in a second direction opposite to the first direction; a first joint portion 1020 for providing a movement path from the first portion to the second portion; and a second joint portion 1040 for providing a movement path from the second portion to the first portion. For example, the blades may be configured to move clockwise within the loop. Accordingly, the target movement direction of the blades in the first portion 1010 may be a (right→left) direction in FIG. 10, and the target movement direction of the blades in the first joint portion 1020 is gradually changed from a (right→left) direction to a (downward→upward) direction, and again in a (left→right) direction, depending on the extent to which the blade has moved from the first portion 1010 to the second portion 1030. The target movement direction of the blades in the second portion 1030 is determined in a (left→right) direction, and the target movement direction of the blades in the second joint portion 1040 is gradually changed from a (left→right) direction to a (upward→downward) direction, and again in a (right→left) direction, depending on the extent to which the blade has moved from the second portion 1030 to the first portion 1010. In other words, the target movement direction of the blades may be determined differently according to a position of each blade in the loop.

When the target movement direction of each blade is determined, based on the information on a wind direction, each blade may be configured to adaptively rotate so that the orientation of each blade is changed to maximize the power in the target movement direction of each blade. For example, rotation of each of the plurality of blades may be performed based on a rotary shaft perpendicular to the ground.

Figure 5:
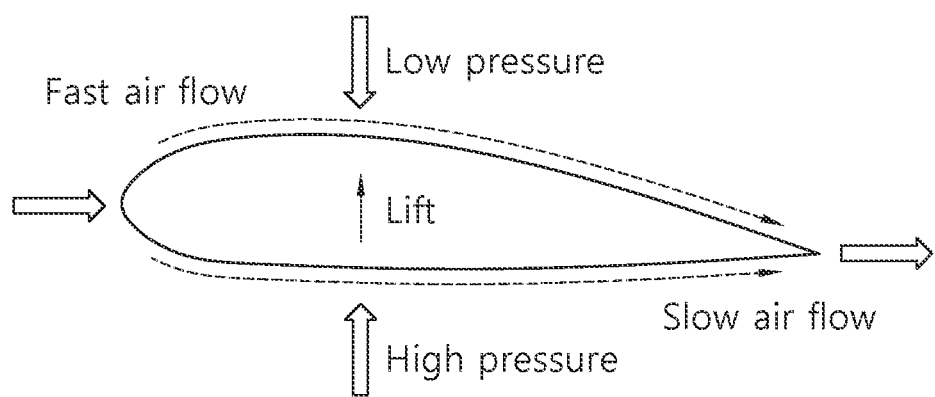
FIG. 5 is a conceptual view of Bernoulli's theorem.
Figure 6:
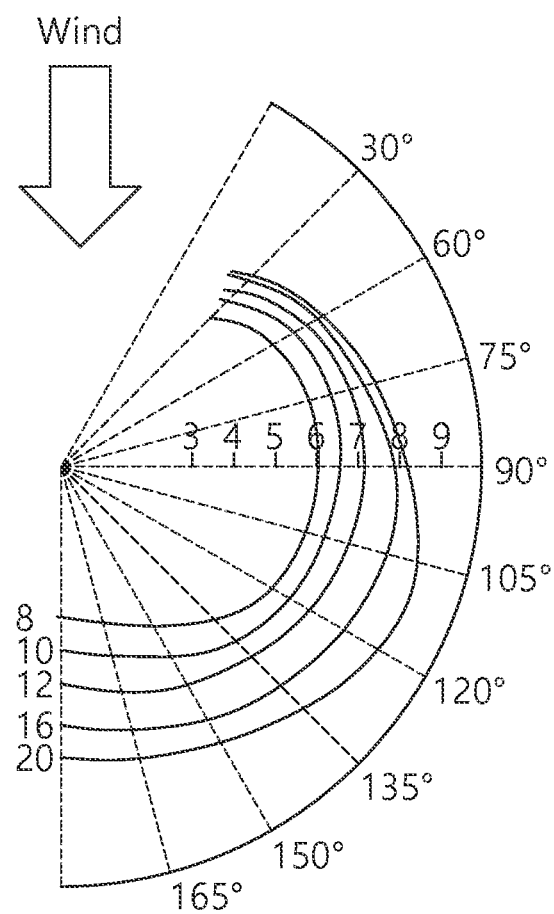
FIG. 6 illustrates a speed of a sailing yacht according to the wind and sailing form.

In relation to maximizing power in the target movement direction according to a wind direction, FIG. 5 is a conceptual view of Bernoulli's theorem, and FIG. 6 illustrates a speed of a sailing yacht according to the wind and sailing form. As illustrated in FIG. 5, Bernoulli's theorem may explain the phenomenon in which lift is generated by generating a pressure difference by changing the speed with respect to the flow of air, and by applying Bernoulli's theorem, the blades may be configured to be oriented so as to maximize power in the desired target movement direction, depending on a wind direction. In addition, FIG. 6 illustrates a speed of a sailing yacht according to the wind and sailing form. As illustrated in FIG. 6, the sailing yacht may generate power so that the yacht is headed in a desired direction even in the same wind direction by appropriately adjusting the direction of the sail. In a similar principle, when the target movement direction is determined according to a position of the blade also in the wind power system according to an embodiment of the present disclosure, the blades are rotated so that the power in the target movement direction may be maximized in consideration of a wind direction, and then the orientation of the blade may be changed.

For example, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction. In FIG. 10, when the wind direction is a (right→left) direction, the blade may be rotated in the direction to perform the leeward sailing in the first portion 1010, and the blade may be rotated in the direction to perform the windward sailing in the second portion 1030. In the first joint portion 1020 and the second joint portion 1040, the blade may be rotated to maximize power according to the target movement direction according to the positions of the respective blades.

According to an aspect of the present disclosure, each blade may be configured in a form such as a sail of a sailing yacht. Each blade may be provided with a support, and a thin film in the form of a sail may be configured to be held by the support. Accordingly, it is possible to configure the wind power system according to an aspect of the present disclosure at a significantly reduced facility cost compared to a conventional wind power generator having a large rotor blade. The thin film in the form of a sail may be formed of a tent material such as hemp cloth or cotton cloth, or a synthetic fiber such as tetron, or a polymer fusion material may also be used.

As described above, with respect to the principle of Bernoulli's theorem and/or the adjustment principle of the heading direction of a sailing yacht, it is possible to deform each of the blades 30 to have a shape that maximizes power in a target movement direction. For example, according to Bernoulli's theorem, by varying the airflow velocity on either side of the blade by increasing the gradient on one side of the blade and making it larger relative to the gradient on the other side, it may be configured to generate power from one specific side of the blade to the opposite side.

In an exemplary embodiment, each of the plurality of blades may be made of a flexible material and have a plurality of air pockets, and may be configured to selectively change an air filling amount in a specific air pocket among the plurality of air pockets. Accordingly, it is possible to implement a shape in which the blade has power in a desired direction under a predetermined wind condition. An air pump may be used, for example, to change the air filling amount.

In another embodiment, a blade in the form of a thin film that does not have a separate air pocket may be controlled by a support in the form of a grid that may change an angle in units of segments, and it may also be configured to deform the blade into a shape that maximizes power in a desired movement direction under a given wind condition by changing an amount of rotation in units of each grid.

Figure 7:
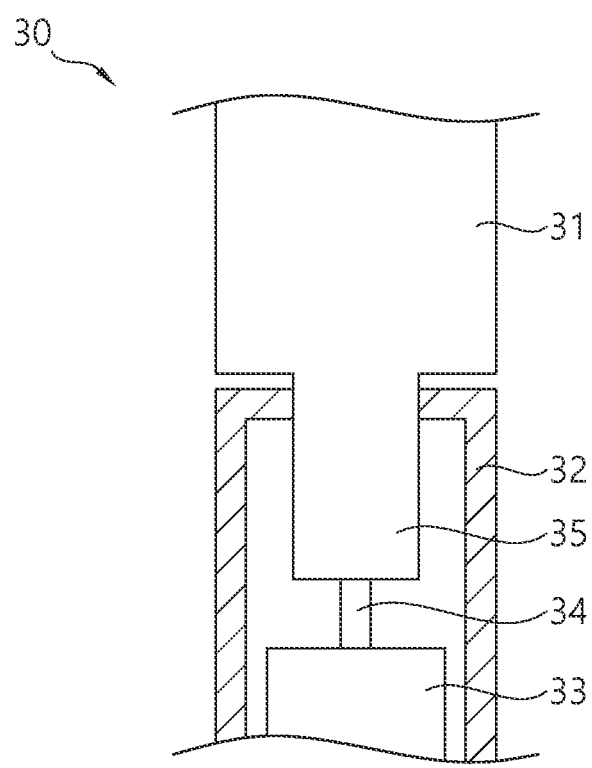
FIG. 7 is a cross-sectional view of a blade support according to an aspect.

According to an aspect of the present disclosure, the rotation of each blade may be, for example, performed based on a rotary shaft perpendicular to the ground. FIG. 7 is a cross-sectional view of a blade support according to an aspect. As illustrated in FIG. 7, the support of each blade may include an upper support 31 configured to support a thin film in the form of a sail and a lower support 32 to which the upper support 31 is rotatably coupled. The lower support 32 provides a cavity through which a blade rotary shaft 35 coupled to the upper support 31 may pass. The blade rotary shaft 35 may be connected to a motor shaft 34 to rotate the upper support by rotation based on the rotary force from a motor 33, and may adjust the orientation of a thin film in the form of a sail in a desired direction.

Figure 8:
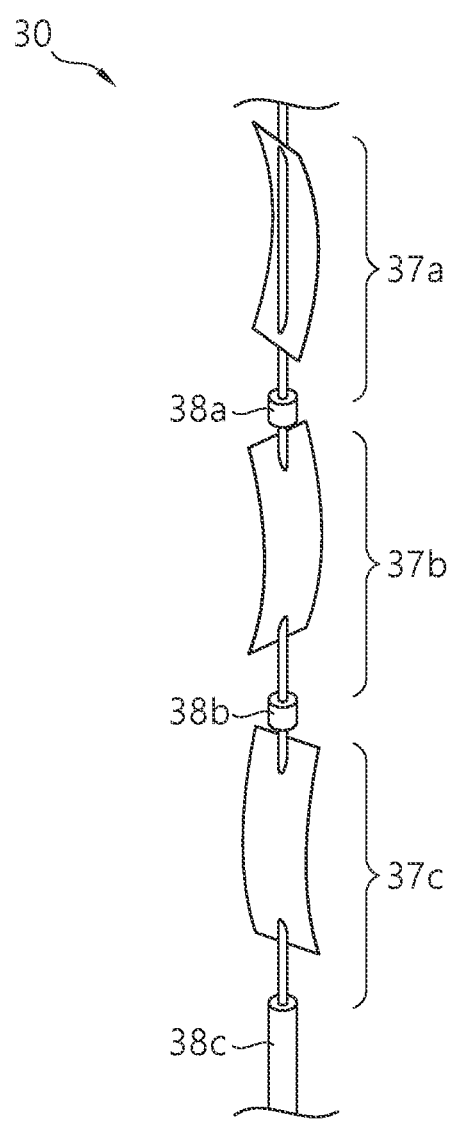
FIG. 8 is an exemplary view of a highly detachable blade according to an aspect.

FIG. 8 is an exemplary view of a highly detachable blade according to an aspect. In the wind power system according to an aspect of the present disclosure, an appropriate blade size for maximizing power generation efficiency may be a fairly large scale, and a wind direction may be different depending on the altitude. Accordingly, in order to maximize power in a target movement direction of the blade 30, even when a wind direction is different depending on the altitude, the blade has a first portion 37a, a second portion 37b, and a third portion 37c divided according to the attitude, and has a first joint 38a, a second joint 38b, and a third joint 38c. By configuring each joint portion to be rotatable, respectively, it is possible to set the orientation of a thin film in the form of a sail included in each portion differently. In other words, each of the plurality of blades 30 may have a first partial blade and a second partial blade divided in a height direction, the first partial blade and the second partial blade may be configured to be rotatable independently of each other, and the first partial blade and the second partial blade may be rotated to maximize power in the target movement direction of the blade 30 based on information on a wind direction at each arranged height.

The acquisition of position information for determining the target movement direction of the blade and information on a wind direction may be achieved by employing any of the conventional sensor systems, and the control system for determining and changing the orientation of the blade may also select any of the conventional control systems.

For example, the information on a position of each of the plurality of blades in the loop may be acquired by receiving a position identification signal from at least one of a position identification signal generation device provided in a plural number in the loop by a position signal reception device provided in each of the plurality of blades. In another aspect, position information of each blade may be determined by a positioning system such as GPS. The target movement direction according to the position of the blade may be determined according to table information stored in the database, or a computing device may be configured to calculate in real time based on each position and the loop shape. The information on a wind direction may be acquired from a wind direction sensor provided in each of the plurality of blades, and accurate information on a wind direction for each blade may be used. The control system for performing a calculation such as orientation determination may be set to be provided with a separate computing device or processor for each blade, or by having an integrated control system configured to transmit and receive information to and from each blade, the integrated control system may be configured to control each blade.

Referring back to FIG. 2, the wind power system 100 according to an embodiment of the present disclosure may have a plurality of nacelles. For example, the nacelle 40 may have a generator having a generator central shaft gear 45-1, and may also further have a separate nacelle including an additional generator having a generator central shaft gear 45-2.

Depending on the form of a wind power generator, the generator provided in the nacelle 40 may be configured to have a predetermined target rotation speed. Alternatively, it may be required to adjust the target rotation speed as needed.

Figure 9:
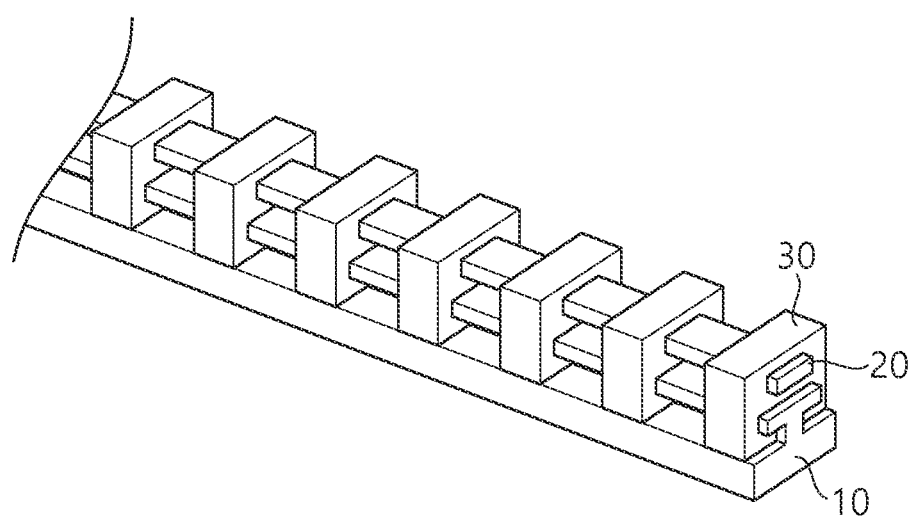
FIG. 9 is a view illustrating a coupling relationship between a rail, a moving body, and a blade according to an aspect.

In this regard, each of the plurality of blades 30 may be configured such that an installation position with respect to the moving body 20 may be changed, and the interval between the blades 30 may be adjusted accordingly. In addition, as described above, each of the blades 30 may be configured to be slidable on the rail 10, and the moving body 20 may also be configured in the form of a chain connecting each of the blades 30. Even in this case, the coupling of the moving body 20 and the blade 30 may be configured in a form in which readjustment is possible. FIG. 9 is a view illustrating a coupling relationship between a rail, a moving body, and a blade according to an aspect. As illustrated in FIG. 9, a plurality of blades 30 may be provided to be slidably movable on the rail 10, and the moving body 20 conjuncts with each of the blades 30 and may be provided in a form in which the coupling position may be readjusted. However, the view illustrating a coupling relationship between the rail, the moving body and the blade in FIG. 9 is an exemplary form, and various embodiments in which the moving body 20 and/or the blade 30 are slidably movable on the rail 10 may be employed.

Figure 11:
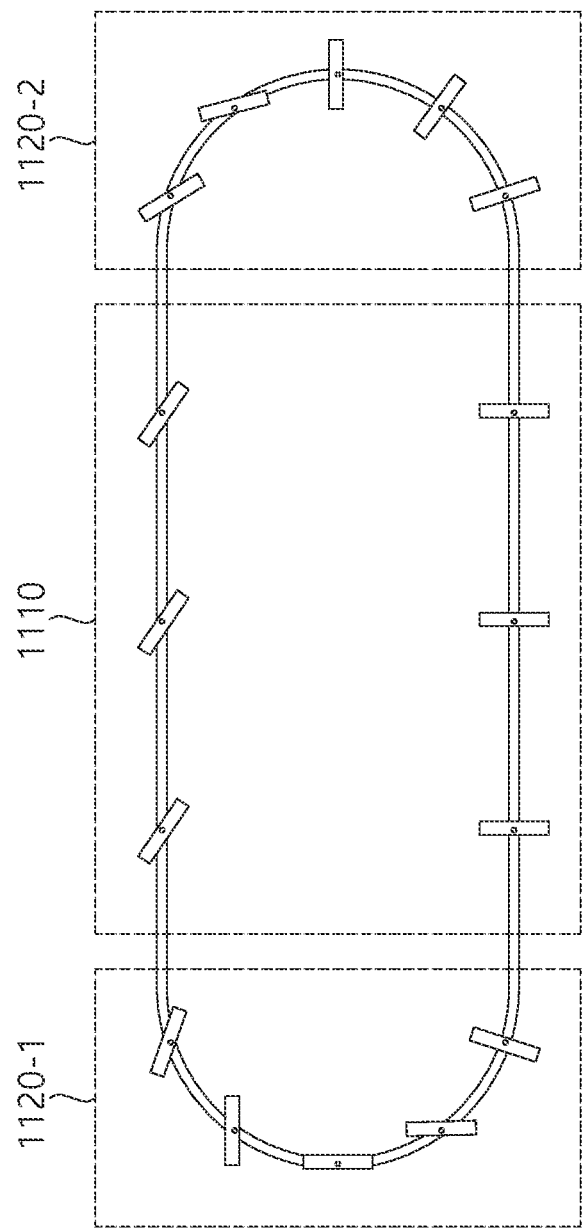
FIG. 11 is a top view of a wind power system with an adjustable blade interval.

FIG. 10 is a top view of a wind power system according to an aspect. FIG. 11 is a top view of a wind power system with an adjustable blade interval. In terms of adjusting the rotation speed of the generator central rotary shaft, a form in which the moving speed of the blade is controlled is possible. As illustrated in FIG. 11, the rail may include a straight section 1110 and curved sections 1120-1 and 1120-2, and the plurality of blades may be configured to be arranged at narrower intervals when positioned in the curved sections 1120-1 and 1120-2 than when positioned in the straight section 1110.

The wind power system according to an embodiment of the present disclosure may be configured such that the rail 10 forms a loop, as illustrated in FIG. 2, and may further include an inner loop formed inside the loop to provide a shorter movement path than the loop, wherein the generator may be configured to have a predetermined target rotation speed, and may be configured to rotate in conjunction with the movement of at least one of the moving body and the blades of any one of the loop and the inner loop to achieve a rotation speed closer to the target rotation speed based on information on a wind speed.

Figure 13:
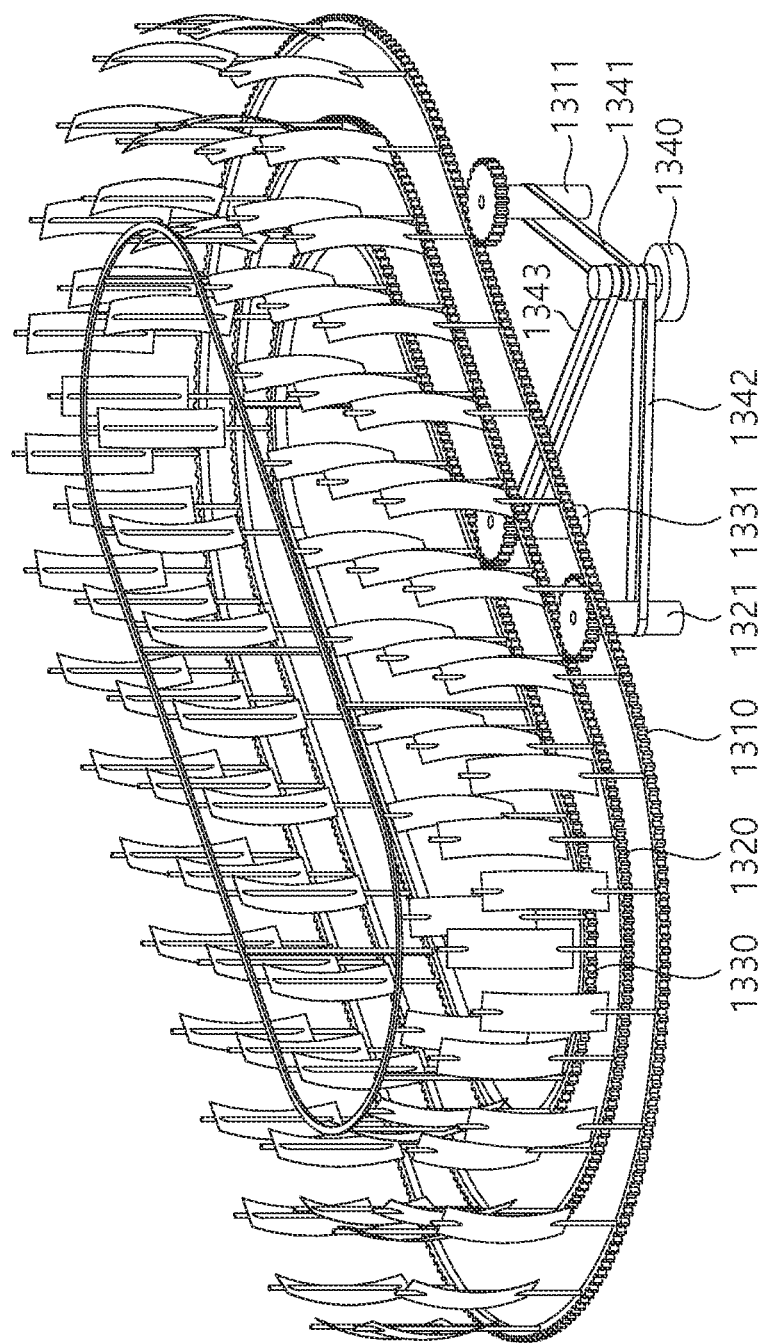
FIG. 13 is an exemplary view of a wind power system capable of gear shift.

More specifically, FIG. 13 is an exemplary view of a wind power system capable of gear shift. As illustrated in FIG. 13, the wind power system according to an embodiment of the present disclosure may include a loop 1310, a first inner loop 1320, and a second inner loop 1330. The first inner loop 1320 is configured to have a shorter movement path than the loop 1310, and the second inner loop 1330 is configured to have a shorter movement path than the first inner loop 1320. Even at the same wind speed, the loop 1310, the first inner loop 1320, and the second inner loop 1330 may be configured to have each different moving speeds. As described above, since the generator may be configured to have a target rotation speed, it may be configured to selectively rotate in conjunction with a loop capable of providing a rotation speed most suitable for the target rotation speed of the generator according to wind speed. For example, as illustrated in FIG. 13, the generator central rotary shaft 1340 may be connected to a first rotational conjunction shaft 1311 for the loop 1310 via a first rotating belt 1341, to a second rotational conjunction shaft 1321 for the first inner loop 1320 via a second rotating belt 1342, and to a third rotational conjunction shaft 1331 for the second inner loop 1330 via a third rotating belt 1343. Each of the first rotating belt 1341 to the third rotating belt 1343 may be configured to be on/off in rotational conjunction with the generator central rotary shaft 1340, so that any one of the first rotating belt 1341 to the third rotating belt 1343 may selectively rotate in conjunction with the generator central rotary shaft 1340. However, the embodiment illustrated in FIG. 13 is exemplary, and a configuration in which any one of a plurality of loops is selected to rotate the central rotary shaft of the generator may be achieved through various embodiments such as a gear box.

Herein, the information on a wind speed may be acquired from a wind speed sensor. A single wind speed sensor may be provided, or it may be installed in each loop or each blade to calculate the expected movement speed of each loop according to each wind speed.

In the wind power system according to an embodiment of the present disclosure, measures to protect the blades may be needed in a situation in which the normal operation of the wind power system is not guaranteed, such as the occurrence of a typhoon. In this regard, for example, a protective measure of the blade may be performed in a way that a housing unit for storage of the blades is installed, the fastening between the blades is made, or the blade is folded toward the ground.

Figure 14:
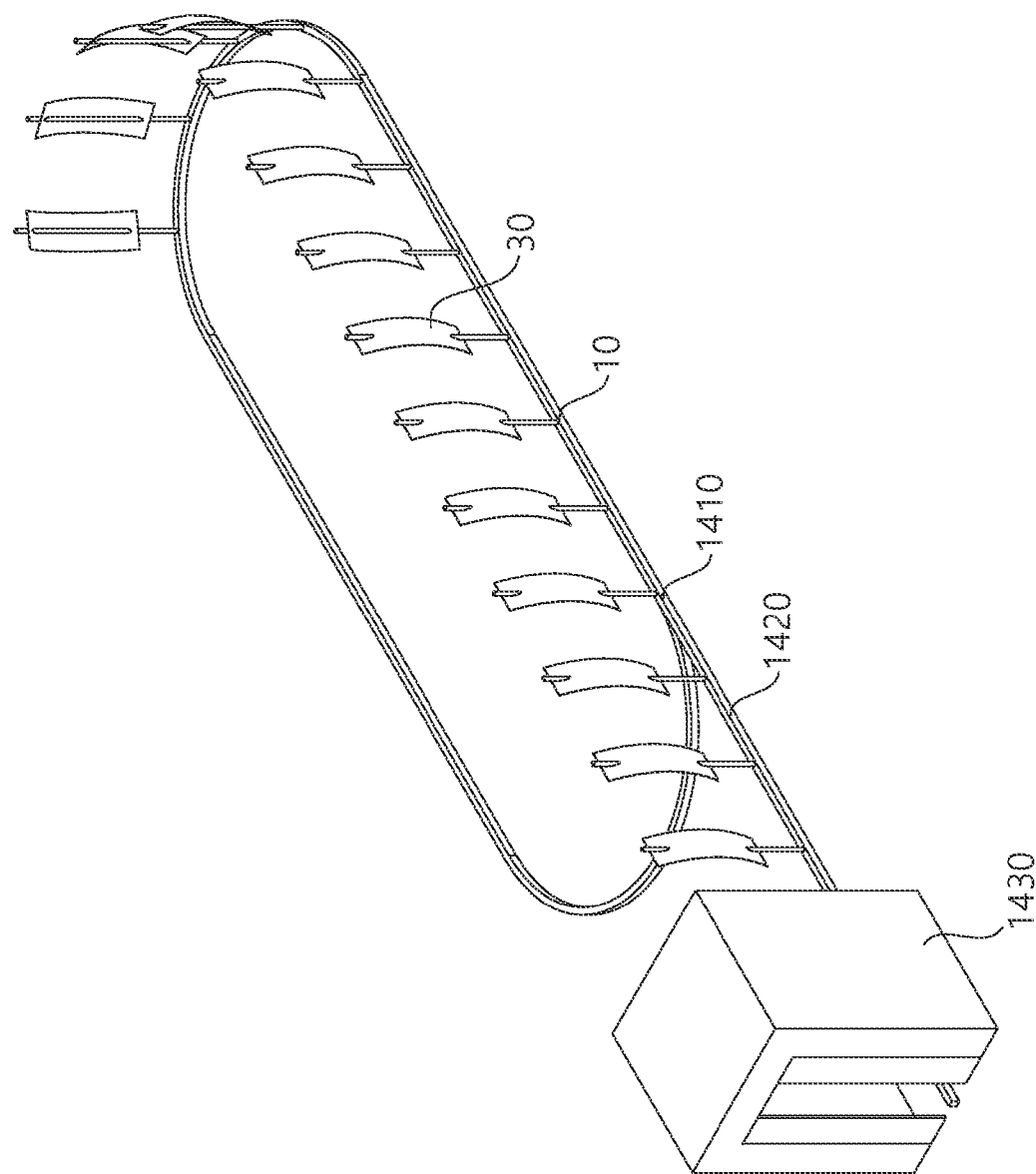
FIG. 14 is an exemplary view of a housing unit built separately.

FIG. 14 is an exemplary view of a housing unit built separately. As illustrated in FIG. 14, the wind power system according to an embodiment of the present disclosure may further include: a housing unit 1430 in which a plurality of blades are housed; a junction 1410 included in a rail; and a housing rail 1420 for providing a movement path from the junction to the housing unit, wherein the plurality of blades 30 may be configured to be housed in the housing unit 1430 via the junction 1410 and the housing rail 1420. As described above, the coupling relationship of the moving body 20 and/or the blade 30 to the rail 10 may be implemented in various embodiments. When the blade 30 itself is configured to be slidably movable on the rail 10, the blades 30 may be moved as a measure from the junction 1410 on the rail 10 to the housing rail 1420 when protective measures are needed, and may be slidably moved along the housing rail 1420 to be housed in the housing unit 1430 as a measure. In another embodiment, the moving body 20 may be slidably moved on the rail 10, and the blade 30 may be provided so that an installation position with respect to the moving body 20 may be changed. In this embodiment, the moving body 20 may be configured such that a portion of the loop is separable, and at a time when a protective measure of the blade is needed, a portion of the loop of the moving body 20 may be separated and moved to extend along the housing rail 1420 to the housing unit 1430 via the junction 1410. Since the installation position of the blade on the moving body 20 may be changed, the blades may be moved on the moving body 20 extending along the housing rail 1420 and housed in the housing unit 1430.

Figure 15:
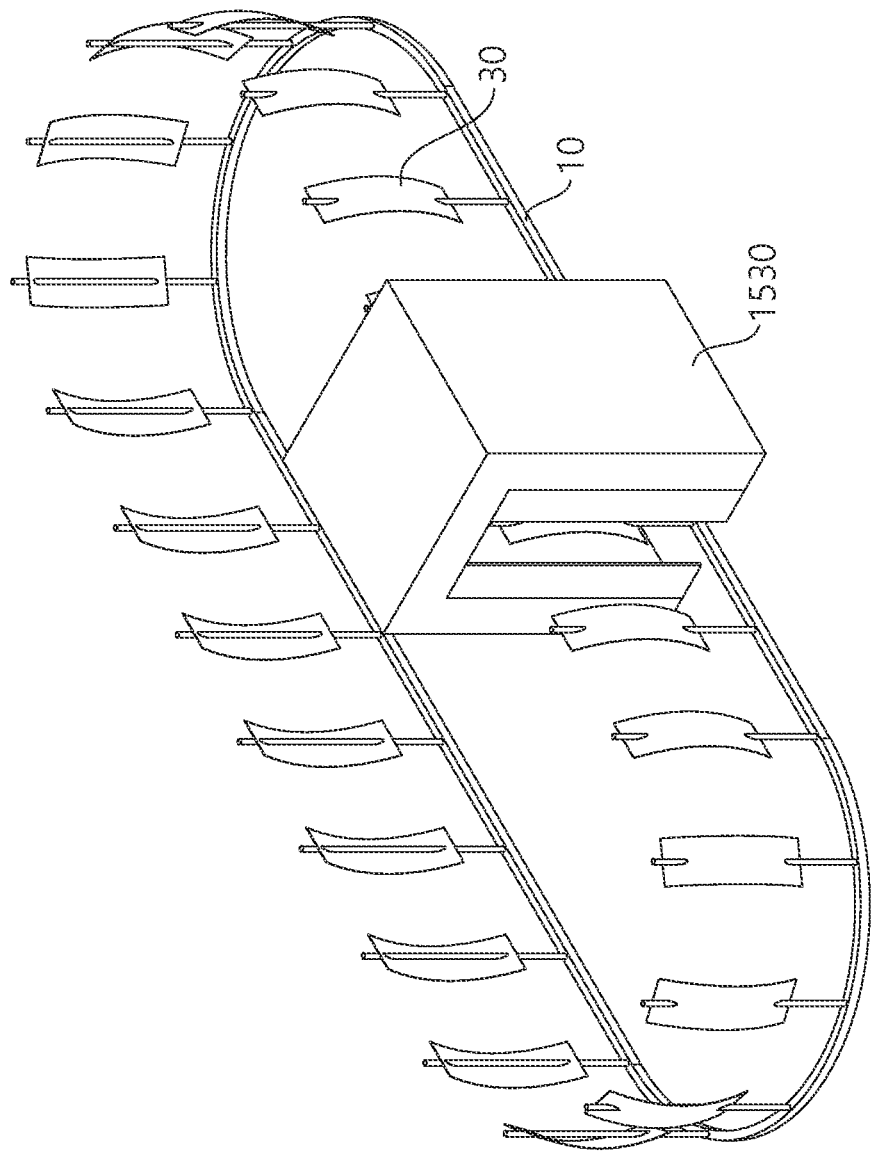
FIG. 15 is an exemplary view of a housing unit built on a rail.

FIG. 15 is an exemplary view of a housing unit built on a rail. As illustrated in FIG. 15, the wind power system according to an embodiment of the present disclosure may further include a housing unit 1530 configured to pass through the rail 10, and the plurality of blades 30 may be configured to be housed in the housing unit 1530 by moving along the rail 10. Also in the embodiment illustrated by FIG. 15, as in FIG. 14, the blades 30 may be moved to the housing unit 1530 in various ways according to the coupling relationship of the moving body and/or the blade with the rail.

Figure 16:
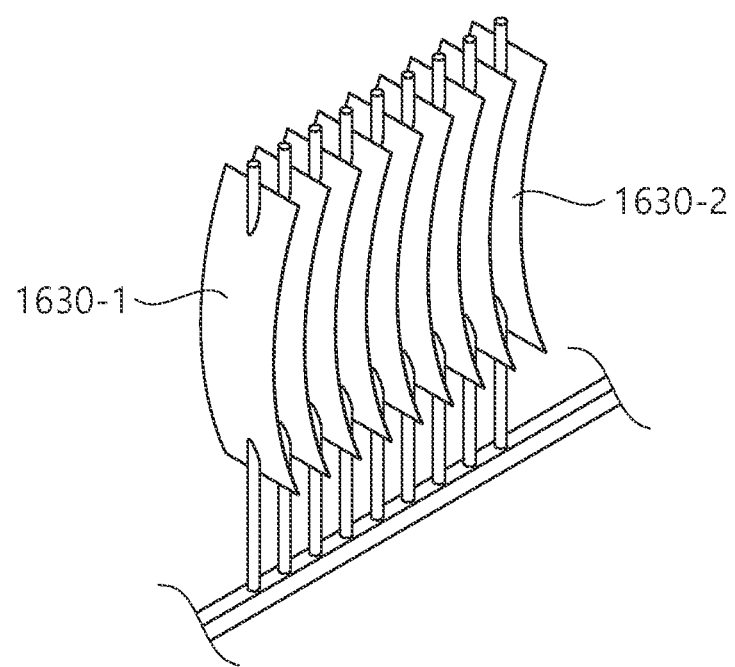
FIG. 16 is an exemplary view of a fastening form between blades.

FIG. 16 is an exemplary view of a fastening form between blades. As illustrated in FIG. 16, a plurality of blades of a blade 1630-1 to a blade 1630-2 may be coupled to each other when protective measures against typhoons are needed.

According to an aspect, each of the plurality of blades may include a fastening unit for coupling with an adjacent blade when an interval between the plurality of blades is minimized. In other words, as a result, the plurality of blades are all coupled through fastening between adjacent blades, thereby improving resistance to typhoons.

According to another aspect, the plurality of blades may include a first blade 1630-1 positioned on a leftmost side and a second blade 1630-2 positioned on a rightmost side when an interval between the plurality of blades is minimized, wherein the first blade 1630-1 and the second blade 1630-2 may each have a fastening unit, and the plurality of blades may be coupled by the fastening unit of the first blade and the fastening unit of the second blade that are fastened to each other. In addition, a configuration in which a plurality of blades are coupled through various embodiments is possible.

Figure 17:
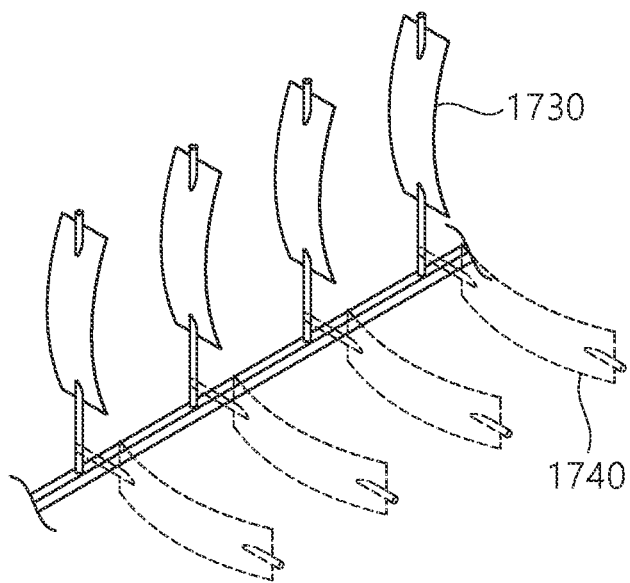
FIG. 17 is an exemplary view of a blade foldable in a ground direction.

FIG. 17 is an exemplary view of a blade foldable in a ground direction. As illustrated in FIG. 17, each of the plurality of blades may be configured to be foldable toward a ground direction. The blades that are normally positioned in a normal position 1730 and generate power based on wind energy are folded to a ground adjacent position 1740 at a time when protective measures are needed, such as a risk of typhoon, to minimize the influence of the wind.

Figure 18:
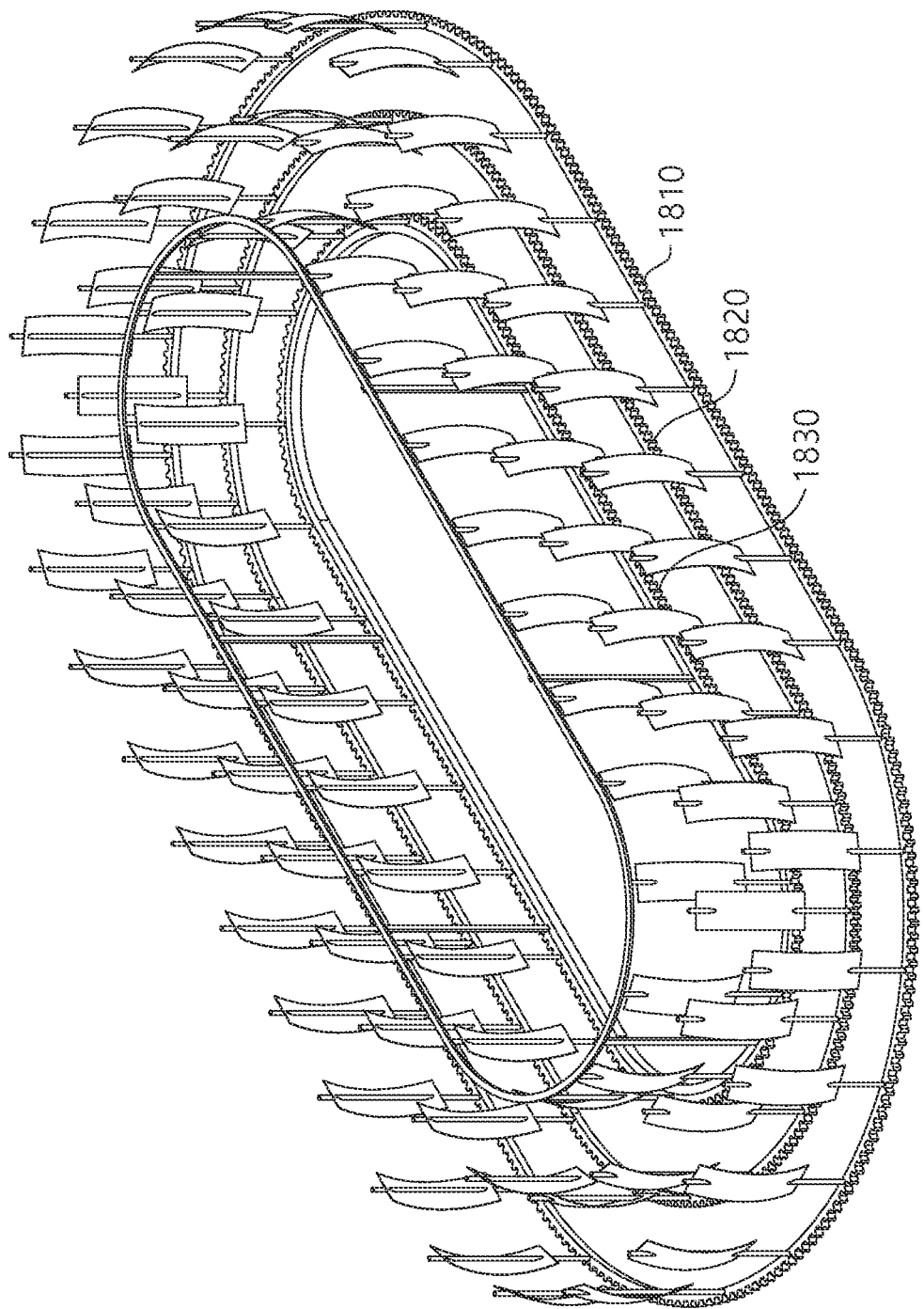
FIG. 18 is an exemplary view of an arrangement form of a plurality of rails having concentricity.
Figure 19:
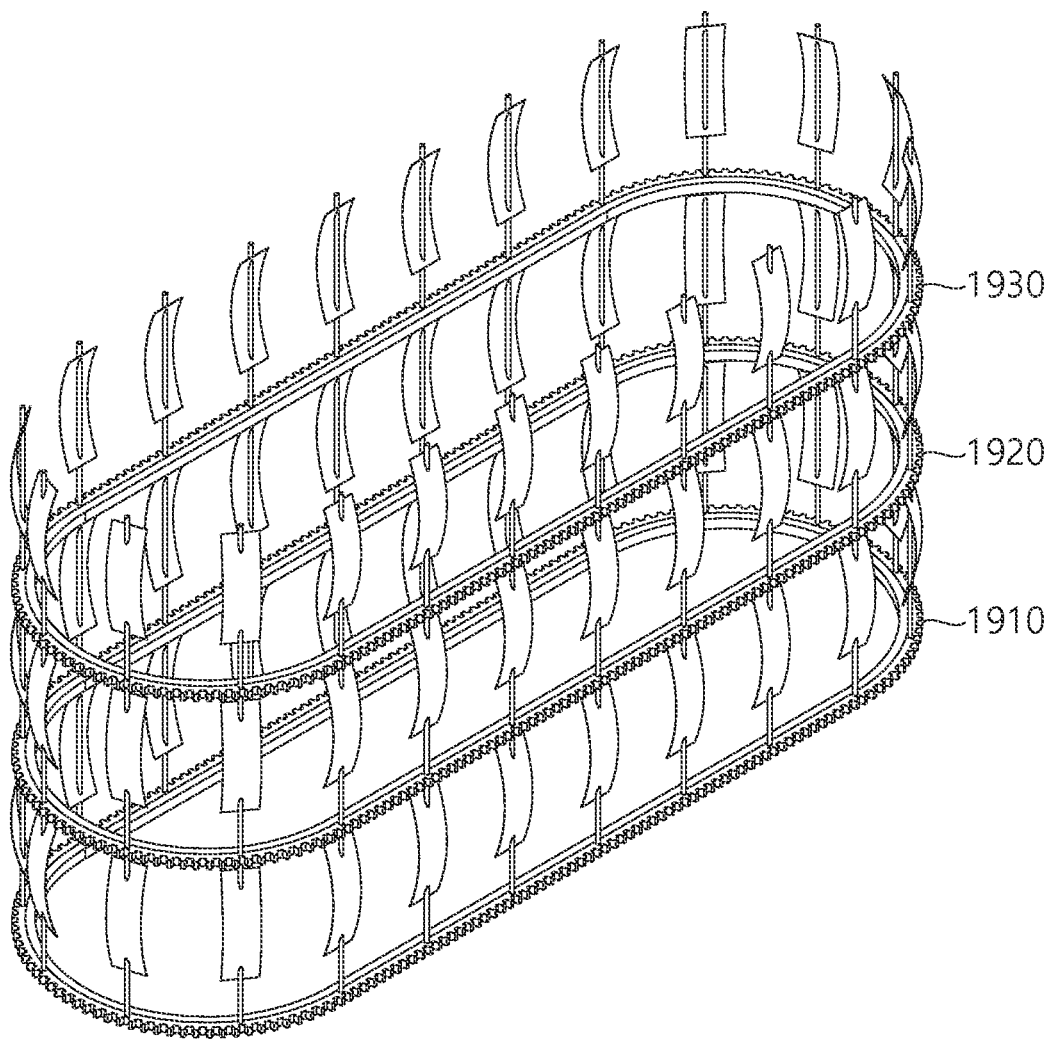
FIG. 19 is an exemplary view of an arrangement form of a plurality of layered rails.

It is possible to configure the wind power generation system according to an embodiment of the present disclosure in the form of a wind farm capable of generating a large amount of power. In this regard, FIG. 18 is an exemplary view of an arrangement form of a plurality of rails having concentricity, and FIG. 19 is an exemplary view of an arrangement form of a plurality of layered rails. As illustrated in FIG. 18, a first loop 1810, a second loop 1820, and a third loop 1830 are concentrically arranged to have different moving lengths, so that space utilization can be improved. Alternatively, as illustrated in FIG. 19, the first loop 1810, the second loop 1820, and the third loop 1830 are sequentially stacked in a vertical direction to improve space utilization. The embodiments of FIGS. 18 and 19 may be implemented in combination.

Although the rail in the drawings is illustrated in a completely horizontal form on the ground, a considerable level of curvature may also be applied to the rail depending on the terrain. In addition, it is also possible to implement a rail in a form including a number of curves rather than a straight line form. In the present disclosure, a "horizontal direction" should be understood to include all directions having an approximate inclination other than a vertical direction as well as the complete horizontal direction as described above.

Second Embodiment

Figure 20:
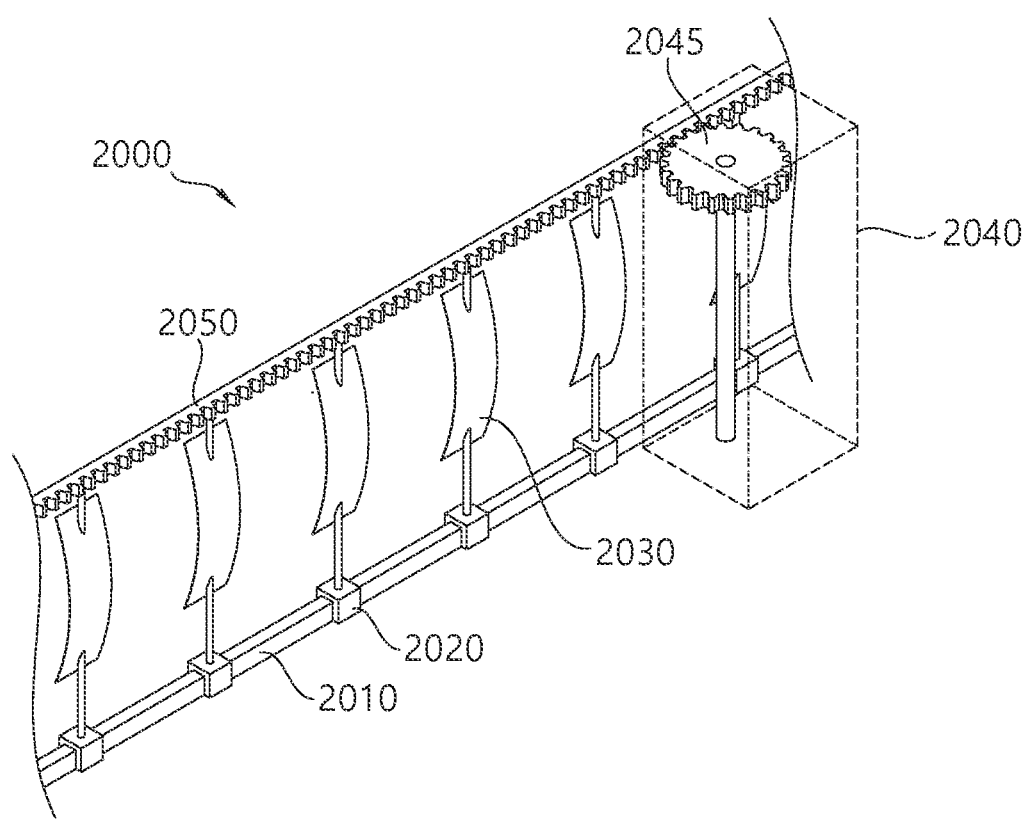
FIG. 20 is a conceptual view of a wind power system according to a second embodiment of the present disclosure.

FIG. 20 is a conceptual view of a wind power system according to a second embodiment of the present disclosure. As illustrated in FIG. 20, a wind power system 2000 according to an embodiment of the present disclosure may include a rail 2010, a moving body 2020, a plurality of blades 2030, a coupling body 2050, and a nacelle 2040 having a generator.

The rail 2010 may provide a horizontal movement path through which the plurality of moving bodies 2020 slide and move. Here, the horizontal direction may be roughly understood as a movement path along the ground or water surface as well as a complete horizontal direction in a mathematical sense as described above. In the embodiment illustrated through FIG. 20, it is exemplified as providing a movement path so that the moving body 2020 is slid on the rail 2010. However, as previously illustrated for example in FIG. 1 or 2, the rail 2010 may have various design forms that may provide a movement path through which the moving body 2020 may slide and move, including a form that the rail 2010 provides a movement path from a side of the moving body 2020. As illustrated in FIG. 20, the rail 2010 according to an embodiment of the present disclosure may be installed on the ground or installed through a support to provide a movement path in a horizontal direction of the moving bodies 2020.

The plurality of moving bodies 2020 may be configured to slide and move along the movement path provided by the rail 2010. Here, each of the plurality of moving bodies 2020 may be installed on each of the plurality of moving bodies and may have the blade 2030 to provide power for the movement of each of the plurality of moving bodies based on energy from the wind. In other words, each moving body 2020 may slide and move along a movement path provided by the rail 2010 according to the power of the blade 2030 based on the wind.

In other words, the plurality of blades 2030 may be installed on the moving body 2020 to provide power for movement of the moving body 2020 based on energy from wind. In other words, when the wind blows, the energy provided by the wind acts on the blades 2030, and the blades 2030 and the moving body 2020 to which the blades are connected are configured to move. In the embodiment illustrated in FIG. 20, it is exemplified that the moving body 2020 contacts the rail 2010 and the blades 30 are installed on the moving body 2020, but the installation form and structure of the rail 2010, the moving body 2020, and the blades 2030 may be employed in various modifications.

As illustrated in FIG. 20, there may be provided a coupling body 2050 fastened to an upper end of a blade provided in each of the plurality of moving bodies and moving based on power provided by the blade. In an aspect, the coupling body 2050 may also be integrally formed as illustrated in FIG. 20, and in another aspect, the coupling body 2050 may be in the form of a chain having a plurality of segment structures. Further, according to the embodiment, the coupling body 2050 may be configured of a flexible material.

Referring back to FIG. 20, the nacelle 2040 having a generator may be arranged to be adjacent to the coupling body 2050. According to an aspect, the generator may be a generator that generates power according to the rotation of a generator central shaft gear 2045 coupled to a generator central rotary shaft, and the central rotary shaft of the generator may be configured to rotate in conjunction with the movement of the coupling body 2050. FIG. 20 exemplarily illustrates a configuration in which the generator central rotary shaft rotates in conjunction with the movement of the coupling body 2050.

In this regard, as previously described in relation to the first embodiment, FIG. 3 illustrates a power transfer structure between a blade and/or a moving body and a generator central rotary shaft according to a first aspect. FIG. 4 illustrates a power transfer structure between a blade and/or a moving body and a generator central rotary shaft according to a second aspect. In this regard, the power transfer structure of FIGS. 3 and 4 may also be employed in the power transfer structure between the coupling body 2050 and the generator central rotary shaft of the second embodiment.

For example, as illustrated in FIG. 3, the generator may have a generator central rotary shaft 45c and a circular toothed gear 45 coupled to the generator central rotary shaft 45c, a plurality of toothed threads may be provided on a surface facing the generator of the coupling body 2050 (FIG. 20), and the generator central rotary shaft 45c may be configured to rotate as the toothed threads move in engagement with toothed threads 45a of the circular toothed gear 45 according to the movement of the coupling body 2050.

For a similar purpose, the features of the present disclosure described below with reference to the first embodiment and related drawings may also be applied to the second embodiment. In the following description, it will be described together with the reference numerals of the rail and the moving body of the first embodiment, but those skilled in the art will be able to easily apply to the second embodiment according to the description.

FIG. 12 is an exemplary view of the arrangement of a generator central rotary shaft. As illustrated in FIG. 12, the generator central shaft may have various embodiments in relation to the rail. According to an aspect, in an embodiment in which the rail 10 and the moving body 20 form a loop as illustrated in FIG. 12, generator central rotary shafts 1210 and 1220 may also be positioned outside the loop, and may also be positioned inside the loop. In addition, the rotation of the generator central rotary shafts 1210 and 1220 may also directly conjunct with the movement of the coupling body 2050, and may also be configured to rotate in conjunction with a medium unit such as a generator central rotary shaft 1230. The wind power system according to an embodiment of the present disclosure may further include a power transfer shaft 1231 that rotates in conjunction with the movement of the coupling body 2050, and a rotation pulley provided on the power transfer shaft 1231 and a rotation pulley provided on the generator central rotary shaft 1230 of the generator may also be configured to rotate in conjunction with a rotating belt 1233. The rotating belt 1233 may also be configured, for example, in the form of a conveyor belt or chain.

Referring to FIGS. 1 and 2, in the wind power system according to an embodiment of the present disclosure, the rail 10 may be configured to form a loop. According to an aspect, in the second embodiment, the rail 2010 may further include an upper frame supported by a plurality of upper frame supports, wherein the upper frame may be configured to maintain coupling body 2050 movably to improve the standing stability of the blades 2030.

Since the rail 10 and 2010 is formed as a loop, the movement path of the plurality of blades and/or the moving body may have a circulating structure. Herein, each of the plurality of blades 2030 may be configured to adaptively rotate to maximize power in a target movement direction based on information on a wind direction and information on the target movement direction determined according to a position of each of the plurality of blades 2030 in the loop.

According to another aspect, each of the plurality of blades 2030 may be configured of a flexible material and have a plurality of air pockets, and may also be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

The target movement direction will be described in more detail with reference to FIG. 10. FIG. 10 is a top view of a wind power system according to an aspect. As illustrated in FIG. 10, according to an embodiment of the present disclosure, the loop formed by the rail 10 may include, for example: a first portion 1010 for providing a movement path in a first direction; a second portion 1030 for providing a movement path in a second direction opposite to the first direction; a first joint portion 1020 for providing a movement path from the first portion to the second portion; and a second joint portion 1040 for providing a movement path from the second portion to the first portion. For example, the blades may be configured to move clockwise within the loop. Accordingly, the target movement direction of the blades in the first portion 1010 may be a (right→left) direction in FIG. 10, and the target movement direction of the blades in the first joint portion 1020 is gradually changed from a (right→left) direction to a (downward→upward) direction, and again in a (left→right) direction, depending on the extent to which the blades have moved from the first portion 1010 to the second portion 1030. The target movement direction of the blades in the second portion 1030 is determined in a (left→right) direction, and the target movement direction of the blades in the second joint portion 1040 is gradually changed from a (left→right) direction to a (upward→downward) direction, and again in a (right→left) direction, depending on the extent to which the blades have moved from the second portion 1030 to the first portion 1010. In other words, the target movement direction of the blades may be determined differently according to a position of each blade in the loop.

When the target movement direction of each blade is determined, based on the information on a wind direction, each blade may be configured to adaptively rotate so that the orientation of each blade is changed to maximize the power in the target movement direction of each blade. For example, rotation of each of the plurality of blades may be performed based on a rotary shaft perpendicular to the ground.

For example, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction. In FIG. 10, when the wind direction is a (right→left) direction, the blade may be rotated in the direction to perform the leeward sailing in the first portion 1010, and the blade may be rotated in the direction to perform the windward sailing in the second portion 1030. In the first joint portion 1020 and the second joint portion 1040, the blade may be rotated to maximize power according to the target movement direction according to the positions of the respective blades.

According to an aspect of the present disclosure, each blade may be configured in a form such as a sail of a sailing yacht. Each blade may be provided with a support, and a thin film in the form of a sail may be configured to be held by the support. Accordingly, it is possible to configure the wind power system according to an aspect of the present disclosure at a significantly reduced facility cost compared to a conventional wind power generator having a large rotor blade. The thin film in the form of a sail may be formed of a tent material such as hemp cloth or cotton cloth, or a synthetic fiber such as tetron, or a polymer fusion material may also be used.

As described above, with respect to the principle of Bernoulli's theorem and/or the adjustment principle of the heading direction of a sailing yacht, it is possible to deform each of the blades 30 to have a shape that maximizes power in a target movement direction. For example, according to Bernoulli's theorem, by varying the airflow velocity on either side of the blade by increasing the gradient on one side of the blade and making it larger relative to the gradient on the other side, it may be configured to generate power from one specific side of the blade to the opposite side.

In an exemplary embodiment, each of the plurality of blades may be made of a flexible material and have a plurality of air pockets, and may be configured to selectively change an air filling amount in a specific air pocket among the plurality of air pockets. Accordingly, it is possible to implement a shape in which the blade has power in a desired direction under a predetermined wind condition. An air pump may be used, for example, to change the air filling amount.

In another embodiment, a blade in the form of a thin film that does not have a separate air pocket may be controlled by a support in the form of a grid that may change an angle in units of segments, and it may also be configured to deform the blade into a shape that maximizes power in a desired movement direction under a given wind condition by changing an amount of rotation in units of each grid.

According to an aspect of the present disclosure, the rotation of each blade may be, for example, performed based on a rotary shaft perpendicular to the ground. FIG. 7 is a cross-sectional view of a blade support according to an aspect. As illustrated in FIG. 7, the support of each blade may include an upper support 31 configured to support a thin film in the form of a sail and a lower support 32 to which the upper support 31 is rotatably coupled. The lower support 32 provides a cavity through which a blade rotary shaft 35 coupled to the upper support 31 may pass. The blade rotary shaft 35 may be connected to a motor shaft 34 to rotate the upper support by rotation based on the rotary force from a motor 33, and may adjust the orientation of a thin film in the form of a sail in a desired direction.

FIG. 8 is an exemplary view of a highly detachable blade according to an aspect. In the wind power system according to an aspect of the present disclosure, an appropriate blade size for maximizing power generation efficiency may be a fairly large scale, and a wind direction may be different depending on the altitude. Accordingly, in order to maximize power in a target movement direction of the blade 30, even when a wind direction is different depending on the altitude, the blade has a first portion 37*a*, a second portion 37*b*, and a third portion 37*c* divided according to the attitude, and has a first joint 38*a*, a second joint 38*b*, and a third joint 38*c*. By configuring each joint portion to be rotatable, respectively, it is possible to set the orientation of a thin film in the form of a sail included in each portion differently. In other words, each of the plurality of blades 30 may have a first partial blade and a second partial blade divided in a height direction, the first partial blade and the second partial blade may be configured to be rotatable independently of each other, and the first partial blade and the second partial blade may be rotated to maximize power in the target movement direction of the blade 30 based on information on a wind direction at each arranged height.

The acquisition of position information for determining the target movement direction of the blade and information on a wind direction may be achieved by employing any of the conventional sensor systems, and the control system for determining and changing the orientation of the blade may also select any of the conventional control systems.

For example, the information on a position of each of the plurality of blades in the loop may be acquired by receiving a position identification signal from at least one of a position identification signal generation device provided in a plural number in the loop by a position signal reception device provided in each of the plurality of blades. In another aspect, position information of each blade may be determined by a positioning system such as GPS. The target movement direction according to the position of the blade may be determined according to table information stored in the database, or a computing device may be configured to calculate in real time based on each position and the loop shape. The information on a wind direction may be acquired from a wind direction sensor provided in each of the plurality of blades, and accurate information on a wind direction for each blade may be used. The control system for performing a calculation such as orientation determination may be set to be provided with a separate computing device or processor for each blade, or by having an integrated control system configured to transmit and receive information to and from each blade, the integrated control system may be configured to control each blade.

Referring back to FIG. 2, the wind power system 100 according to an embodiment of the present disclosure may have a plurality of nacelles. For example, the nacelle 40 may have a generator having a generator central shaft gear 45-1, and may also further have a separate nacelle including an additional generator having a generator central shaft gear 45-2.

Depending on the form of a wind power generator, the generator provided in the nacelle 40 may be configured to have a predetermined target rotation speed. Alternatively, it may be required to adjust the target rotation speed as needed.

In this regard, in the second embodiment, each of the coupling body 2050 and the plurality of blades 2030 may be movably fastened to adjust an interval between the plurality of blades. Here, according to an aspect, the coupling body 2050 may also be configured in the form of a chain connecting each blade 2030. Even in this case, the coupling of the coupling body 2050 and the blade 2030 may be configured in a form in which readjustment is possible.

FIG. 10 is a top view of a wind power system according to an aspect. FIG. 11 is a top view of a wind power system with an adjustable blade interval. In terms of adjusting the rotation speed of the generator central rotary shaft, a form in which the moving speed of the blade is controlled is possible. As illustrated in FIG. 11, the rail may include a straight section 1110 and curved sections 1120-1 and 1120-2, and the plurality of blades may be configured to be arranged at narrower intervals when positioned in the curved sections 1120-1 and 1120-2 than when positioned in the straight section 1110.

The wind power system according to an embodiment of the present disclosure may be configured such that the rail 2010 forms a loop, and may further include an inner loop formed inside the loop to provide a shorter movement path than the loop, wherein the generator may be configured to have a predetermined target rotation speed, and may be configured to rotate in conjunction with the movement of the coupling body of any one of the loop and the inner loop to achieve a rotation speed closer to the target rotation speed based on information on a wind speed.

More specifically, FIG. 13 is an exemplary view of a wind power system capable of gear shift. As illustrated in FIG. 13, the wind power system according to an embodiment of the present disclosure may include a loop 1310, a first inner loop 1320, and a second inner loop 1330. The first inner loop 1320 is configured to have a shorter movement path than the loop 1310, and the second inner loop 1330 is configured to have a shorter movement path than the first inner loop 1320. Even at the same wind speed, the loop 1310, the first inner loop 1320, and the second inner loop 1330 may be configured to have each different moving speeds. As described above, since the generator may be configured to have a target rotation speed, it may be configured to selectively rotate in conjunction with a loop capable of providing a rotation speed most suitable for the target rotation speed of the generator according to wind speed. For example, as illustrated in FIG. 13, the generator central rotary shaft 1340 may be connected to a first rotational conjunction shaft 1311 for the loop 1310 via a first rotating belt 1341, to a second rotational conjunction shaft 1321 for the first inner loop 1320 via a second rotating belt 1342, and to a third rotational conjunction shaft 1331 for the second inner loop 1330 via a third rotating belt 1343. Each of the first rotating belt 1341 to the third rotating belt 1343 may be configured to be on/off in rotational conjunction with the generator central rotary shaft 1340, so that any one of the first rotating belt 1341 to the third rotating belt 1343 may selectively rotate in conjunction with the generator central rotary shaft 1340. However, the embodiment illustrated in FIG. 13 is exemplary, and a configuration in which any one of a plurality of loops is selected to rotate the central rotary shaft of the generator may be achieved through various embodiments such as a gear box.

Herein, the information on a wind speed may be acquired from a wind speed sensor. A single wind speed sensor may be provided, or it may be installed in each loop or each blade to calculate the expected movement speed of each loop according to each wind speed.

In the wind power system according to an embodiment of the present disclosure, measures to protect the blades may be needed in a situation in which the normal operation of the wind power system is not guaranteed, such as the occurrence of a typhoon. In this regard, for example, a protective measure of the blade may be performed in a way that a housing unit for storage of the blades is installed, the fastening between the blades is made, or the blade is folded toward the ground.

FIG. 14 is an exemplary view of a housing unit built separately. As illustrated in FIG. 14, the wind power system according to an embodiment of the present disclosure may further include: a housing unit 1430 in which a plurality of blades are housed; a junction 1410 included in a rail; and a housing rail 1420 for providing a movement path from the junction to the housing unit, wherein the plurality of blades 30 may be configured to be housed in the housing unit 1430 via the junction 1410 and the housing rail 1420. When the plurality of the moving bodies is configured to be slidably movable on the rail 2010, the moving bodies 2020 having the blade 2030 may be moved as a measure from the junction 1410 on the rail 2010 to the housing rail 1420 when protective measures are needed, and may be slidably moved along the housing rail 1420 to be housed in the housing unit 1430 as a measure.

FIG. 15 is an exemplary view of a housing unit built on a rail. As illustrated in FIG. 15, the wind power system according to an embodiment of the present disclosure may further include a housing unit 1530 configured to pass through the rail 10, and the plurality of blades 30 may be configured to be housed in the housing unit 1530 by moving along the rail 10. In the second embodiment, the plurality of moving bodies 2020 having the blade 2030 may move along the rail 2010 to be housed in the housing unit.

FIG. 16 is an exemplary view of a fastening form between blades. As illustrated in FIG. 16, a plurality of blades of a blade 1630-1 to a blade 1630-2 may be coupled to each other when protective measures against typhoons are needed.

According to an aspect, each of the plurality of blades may include a fastening unit for coupling with an adjacent blade when an interval between the plurality of blades is minimized. In other words, as a result, the plurality of blades are all coupled through fastening between adjacent blades, thereby improving resistance to typhoons.

According to another aspect, the plurality of blades may include a first blade 1630-1 positioned on a leftmost side and a second blade 1630-2 positioned on a rightmost side when an interval between the plurality of blades is minimized, wherein the first blade 1630-1 and the second blade 1630-2 may each have a fastening unit, and the plurality of blades may be coupled by the fastening unit of the first blade and the fastening unit of the second blade that are fastened to each other. In addition, a configuration in which a plurality of blades are coupled through various embodiments is possible.

Third Embodiment

Figure 21:
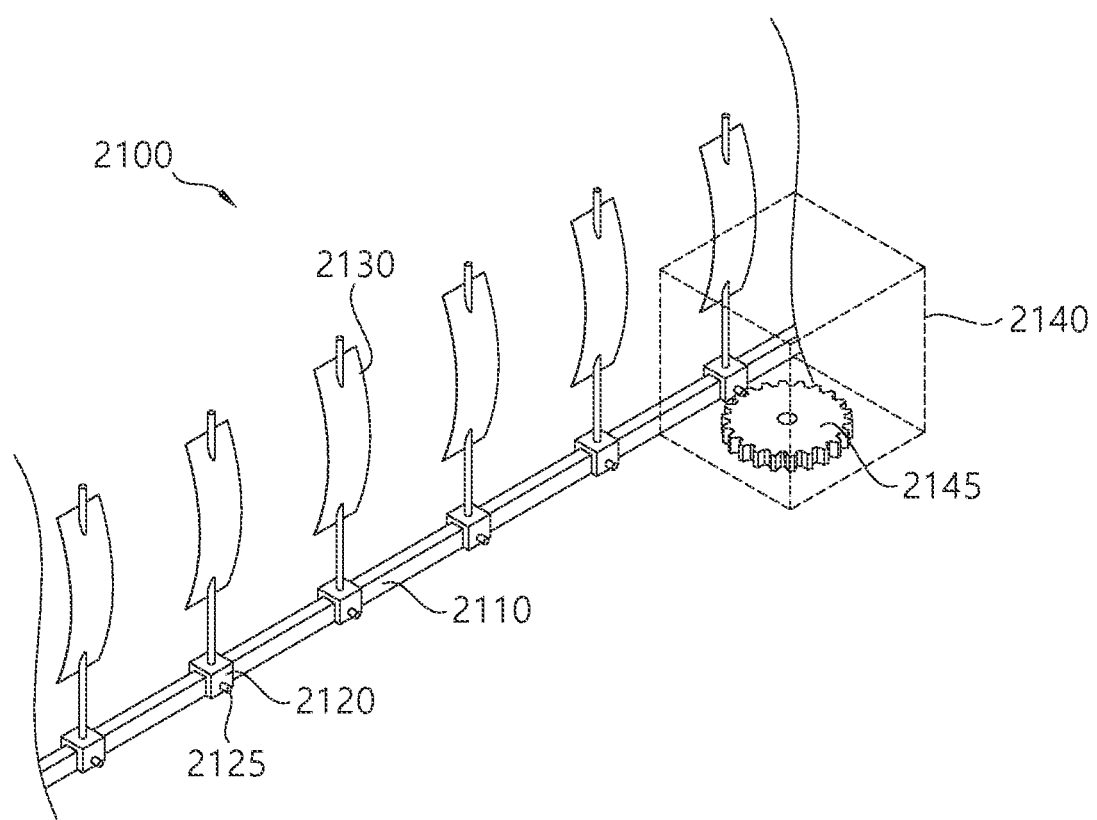
FIG. 21 is a conceptual view of a wind power system according to a third embodiment of the present disclosure.
Figure 22:
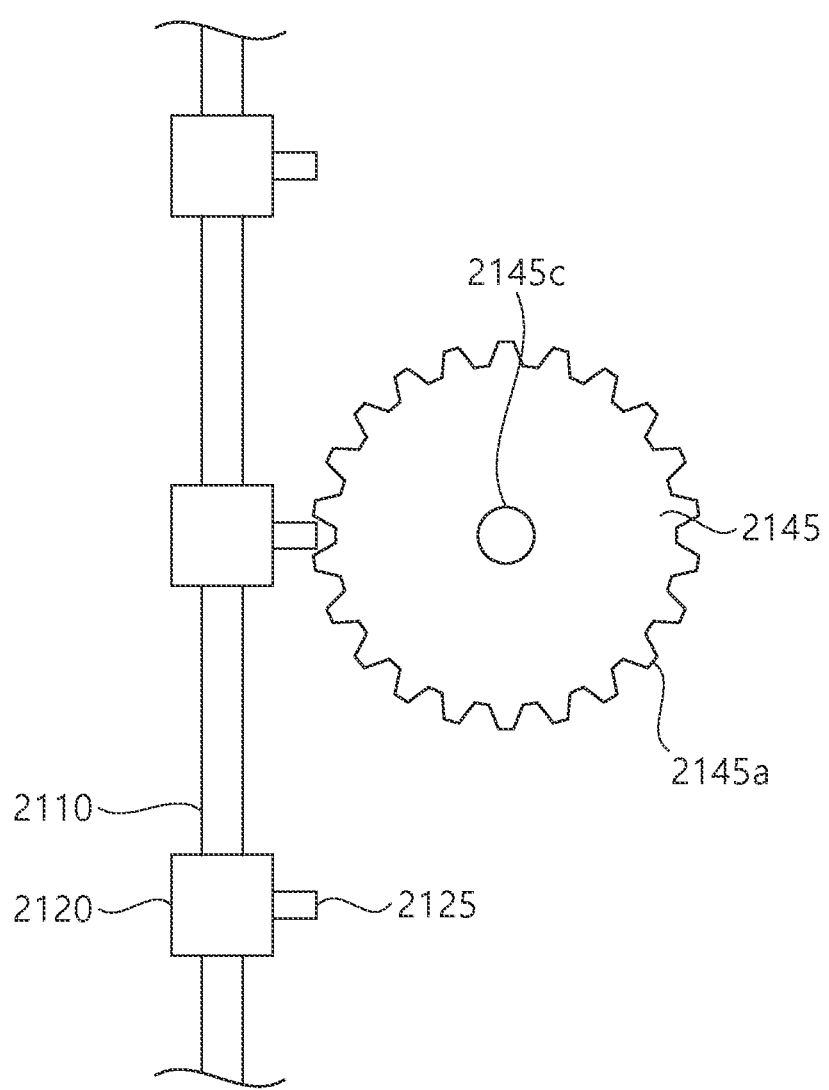
FIG. 22 illustrates a power transfer structure between a moving body and a generator central rotary shaft in the embodiment of FIG. 21.

FIG. 21 is a conceptual view of a wind power system according to a third embodiment of the present disclosure. As illustrated in FIG. 22, a wind power system 2100 according to an embodiment of the present disclosure may include a rail 2110, a moving body 2120, a plurality of blades 2130, and a nacelle 2140 having a generator.

The rail 2110 may provide a horizontal movement path through which the plurality of moving bodies 2120 slide and move. Here, the horizontal direction may be roughly understood as a movement path along the ground or water surface as well as a complete horizontal direction in a mathematical sense as described above. In the embodiment illustrated through FIG. 21, it is exemplified as providing a movement path so that the moving body 2120 is slid on the rail 2110. However, as previously illustrated for example in FIG. 1 or 2, the rail 2110 may have various design forms that may provide a movement path through which the moving body 2120 may slide and move, including a form that the rail 2110 provides a movement path from a side of the moving body 2120. As illustrated in FIG. 21, the rail 2110 according to an embodiment of the present disclosure may be installed on the ground or installed through a support to provide a movement path in a horizontal direction of the moving bodies 2120.

The plurality of moving bodies 2120 may be configured to slide and move along the movement path provided by the rail 2110. Here, each of the plurality of moving bodies 2120 may be installed on each of the plurality of moving bodies and may have the blade 2130 to provide power for the movement of each of the plurality of moving bodies based on energy from the wind. In other words, each moving body 2120 may slide and move along a movement path provided by the rail 2110 according to the power of the blade 2130 based on the wind.

In other words, the plurality of blades 2130 may be installed on the moving body 2120 to provide power for movement of the moving body 2120 based on energy from wind. In other words, when the wind blows, the energy provided by the wind acts on the blades 2130, and the blades 2130 and the moving body 2120 to which the blades are connected are configured to move. In the embodiment illustrated in FIG. 21, it is exemplified that the moving body 2120 contacts the rail 2110 and the blades 2130 are installed on the moving body 2120, but the installation form and structure of the rail 2110, the moving body 2120, and the blades 2130 may be employed in various modifications.

Referring back to FIG. 21, the nacelle 2140 having a generator may be arranged to be adjacent to the moving body 2120 and/or the blade 2130. According to an aspect, the generator may be a generator that generates power according to the rotation of a generator central shaft gear 2145 coupled to a generator central rotary shaft, and the central rotary shaft of the generator may be configured to rotate in conjunction with the movement of at least one of the moving body 2120 and the blade 2130. FIG. 21 illustrates a configuration in which the generator central rotary shaft rotates in conjunction with the movement of the moving body 2120. In this regard, in the exemplary embodiment of FIG. 21, a power transfer rod 2125 may be provided on a surface facing the generator of the moving body 2120.

More specifically, FIG. 22 illustrates a power transfer structure between a moving body and a generator central rotary shaft in the embodiment of FIG. 21. As illustrated in FIG. 22, the generator may have a generator central rotary shaft 2145c and a circular toothed gear 2145 coupled to the generator central rotary shaft 2145c. For example, a blade power transfer rod 2125 may be provided on a side facing the generator of the moving body 2120, and the generator central rotary shaft 2145c may be configured to rotate by acting on a gear toothed thread 2145a formed on the generator central shaft gear 2145 while the blade power transfer rod 2125 moves. Unlike that illustrated in FIG. 22, a power transfer rod may be provided on a side facing the generator of the blade 2130 and may also be configured to induce rotation of the central rotary shaft 2145c.

For a similar purpose, the features of the present disclosure described below with reference to the third embodiment and related drawings may also be applied to the second embodiment. In the following description, it will be described together with the reference numerals of the rail and the moving body of the first embodiment, but those skilled in the art will be able to easily apply to the third embodiment according to the description.

FIG. 12 is an exemplary view of the arrangement of a generator central rotary shaft. As illustrated in FIG. 12, the generator central shaft may have various embodiments in relation to the rail. According to an aspect, in an embodiment in which the rail 10 and the moving body 20 form a loop as illustrated in FIG. 2 or FIG. 12, generator central rotary shafts 1210 and 1220 may also be positioned outside the loop, and may also be positioned inside the loop. In addition, the rotation of the generator central rotary shafts 1210 and 1220 may also directly conjunct with the movement of the moving body and/or the blades, and may also be configured to rotate in conjunction with a medium unit such as a generator central rotary shaft 1230. As illustrated in FIG. 12, the wind power system according to an embodiment of the present disclosure may further include a power transfer shaft 1231 that rotates in conjunction with the movement of at least one of the moving body 20 and the blades 30, and a rotation pulley provided on the power transfer shaft 1231 and a rotation pulley provided on the generator central rotary shaft 1230 of the generator may also be configured to rotate in conjunction with a rotating belt 1233. The rotating belt 1233 may also be configured, for example, in the form of a conveyor belt or chain.

Referring to FIGS. 1 and 2, in the wind power system according to an embodiment of the present disclosure, the rail 10 may be configured to form a loop. According to an aspect, in the third embodiment, the rail 2110 may further include an upper frame supported by a plurality of upper frame supports, wherein the upper frame may be configured to maintain the blades 2130 provided in the moving body 2120 movably to improve the standing stability of the blades 30.

Since the rail 10 and 2110 is formed as a loop, the movement path of the plurality of blades and/or the moving body may have a circulating structure. Herein, each of the plurality of blades 2130 may be configured to adaptively rotate to maximize power in a target movement direction based on information on a wind direction and information on the target movement direction determined according to a position of each of the plurality of blades 2130 in the loop.

According to another aspect, each of the plurality of blades 2130 may be configured of a flexible material and have a plurality of air pockets, and may also be configured to be deformed into a shape that maximizes power in a target movement direction by controlling an air filling amount for at least one air pocket among the plurality of air pockets based on information on a wind direction and information on the target movement direction determined according to a position of each of the plurality of blades in the loop.

The target movement direction will be described in more detail with reference to FIG. 10. FIG. 10 is a top view of a wind power system according to an aspect. As illustrated in FIG. 10, according to an embodiment of the present disclosure, the loop formed by the rail 10 may include, for example: a first portion 1010 for providing a movement path in a first direction; a second portion 1030 for providing a movement path in a second direction opposite to the first direction; a first joint portion 1020 for providing a movement path from the first portion to the second portion; and a second joint portion 1040 for providing a movement path from the second portion to the first portion. For example, the blades may be configured to move clockwise within the loop. Accordingly, the target movement direction of the blades in the first portion 1010 may be a (right→left) direction in FIG. 10, and the target movement direction of the blades in the first joint portion 1020 is gradually changed from a (right→left) direction to a (downward→upward) direction, and again in a (left→right) direction, depending on the extent to which the blades have moved from the first portion 1010 to the second portion 1030. The target movement direction of the blades in the second portion 1030 is determined in a (left→right) direction, and the target movement direction of the blades in the second joint portion 1040 is gradually changed from a (left→right) direction to a (upward→downward) direction, and again in a (right→left) direction, depending on the extent to which the blades have moved from the second portion 1030 to the first portion 1010. In other words, the target movement direction of the blades may be determined differently according to a position of each blade in the loop.

When the target movement direction of each blade is determined, based on the information on a wind direction, each blade may be configured to adaptively rotate so that the orientation of each blade is changed to maximize the power in the target movement direction of each blade. For example, rotation of each of the plurality of blades may be performed based on a rotary shaft perpendicular to the ground.

For example, each of the plurality of blades may be configured to rotate in a direction to perform leeward sailing, in response to a determination that the target movement direction coincides with a wind direction, and each of the plurality of blades may be configured to rotate in a direction to perform windward sailing, in response to a determination that the target movement direction is opposite to the wind direction. In FIG. 10, when the wind direction is a (right→left) direction, the blade may be rotated in the direction to perform the leeward sailing in the first portion 1010, and the blade may be rotated in the direction to perform the windward sailing in the second portion 1030. In the first joint portion 1020 and the second joint portion 1040, the blade may be rotated to maximize power according to the target movement direction according to the positions of the respective blades.

According to an aspect of the present disclosure, each blade may be configured in a form such as a sail of a sailing yacht. Each blade may be provided with a support, and a thin film in the form of a sail may be configured to be held by the support. Accordingly, it is possible to configure the wind power system according to an aspect of the present disclosure at a significantly reduced facility cost compared to a conventional wind power generator having a large rotor blade. The thin film in the form of a sail may be formed of a tent material such as hemp cloth or cotton cloth, or a synthetic fiber such as tetron, or a polymer fusion material may also be used.

As described above, with respect to the principle of Bernoulli's theorem and/or the adjustment principle of the heading direction of a sailing yacht, it is possible to deform each of the blades 2130 to have a shape that maximizes power in a target movement direction. For example, according to Bernoulli's theorem, by varying the airflow velocity on either side of the blade by increasing the gradient on one side of the blade and making it larger relative to the gradient on the other side, it may be configured to generate power from one specific side of the blade to the opposite side.

In an exemplary embodiment, each of the plurality of blades may be made of a flexible material and have a plurality of air pockets, and may be configured to selectively change an air filling amount in a specific air pocket among the plurality of air pockets. Accordingly, it is possible to implement a shape in which the blade has power in a desired direction under a predetermined wind condition. An air pump may be used, for example, to change the air filling amount.

In another embodiment, a blade in the form of a thin film that does not have a separate air pocket may be controlled by a support in the form of a grid that may change an angle in units of segments, and it may also be configured to deform the blade into a shape that maximizes power in a desired movement direction under a given wind condition by changing an amount of rotation in units of each grid.

According to an aspect of the present disclosure, the rotation of each blade may be, for example, performed based on a rotary shaft perpendicular to the ground. FIG. 7 is a cross-sectional view of a blade support according to an aspect. As illustrated in FIG. 7, the support of each blade may include an upper support 31 configured to support a thin film in the form of a sail and a lower support 32 to which the upper support 31 is rotatably coupled. The lower support 32 provides a cavity through which a blade rotary shaft 35 coupled to the upper support 31 may pass. The blade rotary shaft 35 may be connected to a motor shaft 34 to rotate the upper support by rotation based on the rotary force from a motor 33, and may adjust the orientation of a thin film in the form of a sail in a desired direction.

FIG. 8 is an exemplary view of a highly detachable blade according to an aspect. In the wind power system according to an aspect of the present disclosure, an appropriate blade size for maximizing power generation efficiency may be a fairly large scale, and a wind direction may be different depending on the altitude. Accordingly, in order to maximize power in a target movement direction of the blade 30, even when a wind direction is different depending on the altitude, the blade has a first portion 37a, a second portion 37b, and a third portion 37c divided according to the attitude, and has a first joint 38a, a second joint 38b, and a third joint 38c. By configuring each joint portion to be rotatable, respectively, it is possible to set the orientation of a thin film in the form of a sail included in each portion differently. In other words, each of the plurality of blades 30 may have a first partial blade and a second partial blade divided in a height direction, the first partial blade and the second partial blade may be configured to be rotatable independently of each other, and the first partial blade and the second partial blade may be rotated to maximize power in the target movement direction of the blade 30 based on information on a wind direction at each arranged height.

The acquisition of position information for determining the target movement direction of the blade and information on a wind direction may be achieved by employing any of the conventional sensor systems, and the control system for determining and changing the orientation of the blade may also select any of the conventional control systems.

For example, the information on a position of each of the plurality of blades in the loop may be acquired by receiving a position identification signal from at least one of a position identification signal generation device provided in a plural number in the loop by a position signal reception device provided in each of the plurality of blades. In another aspect, position information of each blade may be determined by a positioning system such as GPS. The target movement direction according to the position of the blade may be determined according to table information stored in the database, or a computing device may be configured to calculate in real time based on each position and the loop shape. The information on a wind direction may be acquired from a wind direction sensor provided in each of the plurality of blades, and accurate information on a wind direction for each blade may be used. The control system for performing a calculation such as orientation determination may be set to be provided with a separate computing device or processor for each blade, or by having an integrated control system configured to transmit and receive information to and from each blade, the integrated control system may be configured to control each blade.

Referring back to FIG. 2, the wind power system 100 according to an embodiment of the present disclosure may have a plurality of nacelles. For example, the nacelle 40 may have a generator having a generator central shaft gear 45-1, and may also further have a separate nacelle including an additional generator having a generator central shaft gear 45-2.

Depending on the form of a wind power generator, the generator provided in the nacelle 40 may be configured to have a predetermined target rotation speed. Alternatively, it may be required to adjust the target rotation speed as needed.

In the third embodiment, the plurality of moving bodies 2120 are each movable on the rail 2110, so that an interval between the moving bodies 2120 may be changed. FIG. 10 is a top view of a wind power system according to an aspect. FIG. 11 is a top view of a wind power system with an adjustable blade interval. In terms of adjusting the rotation speed of the generator central rotary shaft, a form in which the moving speed of the blade is controlled is possible. As illustrated in FIG. 11, the rail may include a straight section 1110 and curved sections 1120-1 and 1120-2, and the plurality of blades may be configured to be arranged at narrower intervals when positioned in the curved sections 1120-1 and 1120-2 than when positioned in the straight section 1110.

In the wind power system according to an embodiment of the present disclosure, measures to protect the blades may be needed in a situation in which the normal operation of the wind power system is not guaranteed, such as the occurrence of a typhoon. In this regard, for example, a protective measure of the blade may be performed in a way that a housing unit for storage of the blades is installed, the fastening between the blades is made, or the blade is folded toward the ground.

FIG. 14 is an exemplary view of a housing unit built separately. As illustrated in FIG. 14, the wind power system according to an embodiment of the present disclosure may further include: a housing unit 1430 in which a plurality of blades are housed; a junction 1410 included in a rail; and a housing rail 1420 for providing a movement path from the junction to the housing unit, wherein the plurality of blades 30 may be configured to be housed in the housing unit 1430 via the junction 1410 and the housing rail 1420. As in the third embodiment, when the blades 2130 provided in each moving body 2120 are configured to be slidably movable on the rail 2110, the moving bodies 2120 having the blade 2130 may be moved as a measure from the junction 1410 on the rail 2110 to the housing rail 1420 when protective measures are needed, and may be slidably moved along the housing rail 1420 to be housed in the housing unit 1430 as a measure.

FIG. 15 is an exemplary view of a housing unit built on a rail. As illustrated in FIG. 15, the wind power system according to an embodiment of the present disclosure may further include a housing unit 1530 configured to pass through the rail 10, and the plurality of blades 30 may be configured to be housed in the housing unit 1530 by moving along the rail 10. Also in the embodiment illustrated by FIG. 15, as in FIG. 14, the blades 30 may be moved to the housing unit 1530 in various ways according to the coupling relationship of the moving body and/or the blade with the rail. In the third embodiment, the plurality of moving bodies 2120 may move along the rail 2120 to be housed in the housing unit.

FIG. 16 is an exemplary view of a fastening form between blades. As illustrated in FIG. 16, a plurality of blades of a blade 1630-1 to a blade 1630-2 may be coupled to each other when protective measures against typhoons are needed.

According to an aspect, each of the plurality of blades may include a fastening unit for coupling with an adjacent blade when an interval between the plurality of blades is minimized. In other words, as a result, the plurality of blades are all coupled through fastening between adjacent blades, thereby improving resistance to typhoons.

According to another aspect, the plurality of blades may include a first blade 1630-1 positioned on a leftmost side and a second blade 1630-2 positioned on a rightmost side when an interval between the plurality of blades is minimized, wherein the first blade 1630-1 and the second blade 1630-2 may each have a fastening unit, and the plurality of blades may be coupled by the fastening unit of the first blade and the fastening unit of the second blade that are fastened to each other. In addition, a configuration in which a plurality of blades are coupled through various embodiments is possible.

FIG. 17 is an exemplary view of a blade foldable in a ground direction. As illustrated in FIG. 17, each of the plurality of blades may be configured to be foldable toward a ground direction. The blades that are normally positioned in a normal position 1730 and generate power based on wind energy are folded to a ground adjacent position 1740 at a time when protective measures are needed, such as a risk of typhoon, to minimize the influence of the wind.

Example

The wind power system according to an aspect of the present disclosure can achieve improved power efficiency and reduced noise generation compared to the conventional large fan type wind power generator. For an experiment on the power performance and noise generation of the wind power system according to an aspect of the present disclosure, a computer fluid dynamics model for the wind power system of the experimental example may be implemented under the following design conditions.

A plurality of blades are sequentially arranged on a rail forming a loop to form driving energy based on the wind Calculation area size: 300×250×200 (m³) (same scale as Jeju Gasiri Power Plant)

Turbine airfoil (NACA0009—sail shape): Horizontal length=90 (m)/Vertical height=120 (m)/Maximum lift angle of incidence=5.5 degree/Distance between turbines=150 (m)/Moving speed on rail=1.9 m/s (based on maximum generator efficiency)

Wind conditions: Average wind speed=11.4 m/s ($Re_{chord} \approx 7 \times 10^7$)/Wind conditions=0 (headwind), 45, 90 (crosswind), 180 (tailwind) degrees A computer fluid dynamics analysis was used to measure an amount of electric power generated based on the energy generated by the moving blades of the model in a straight area on the rail, and the efficiency of the conventional wind power system was compared.

In relation to the selection/characteristics of the power generator for output measurement compared to a conventional wind turbine, it was evaluated based on a generator with an efficiency of 94.4%. A hub (gear) is connected to the rail and configured to transfer torque to the central shaft of a generator nacelle. The properties of the hub and nacelle were determined by a reference wind turbine of 5 MW NREL (see https://www.nrel.gov/docs/fy09osti/38060.pdf).

As a method for measuring the output, a flow and a vortex in a crosswind were considered. The generated power was estimated according to Equation 1 below.

$$\text{Power} = (\vec{F}_{lift} \cdot \vec{e}_v + \vec{F}_{drag} \cdot \vec{e}_v) \times |\vec{v}_{airfoil}| \times \text{Efficiency} \quad \text{[Equation 1]}$$

As used herein, $\vec{e}_v$ refers to a unit vector in the movement direction of a blade.

The calculated output values for each wind direction are shown in Table 1 below.

TABLE 1

| Wind direction | | X direction force | Y direction force | Estimated power |
|---|---|---|---|---|
| 0° - headwind | | 338.0 KN | −48.9 KN | −87.7 KW |
| 45° - headwind | | 245.3 KN | 136.8 KN | 245 KW |
| 90° - crosswind | | 57.9 KN | 166.2 KN | 298.1 KW |
| 180° - tailwind | Before | −23.9 KN | 1183 KN | 2122 KW |
| | After | −13.1 KN | 725 KN | 1300 KW |

Figure 23:
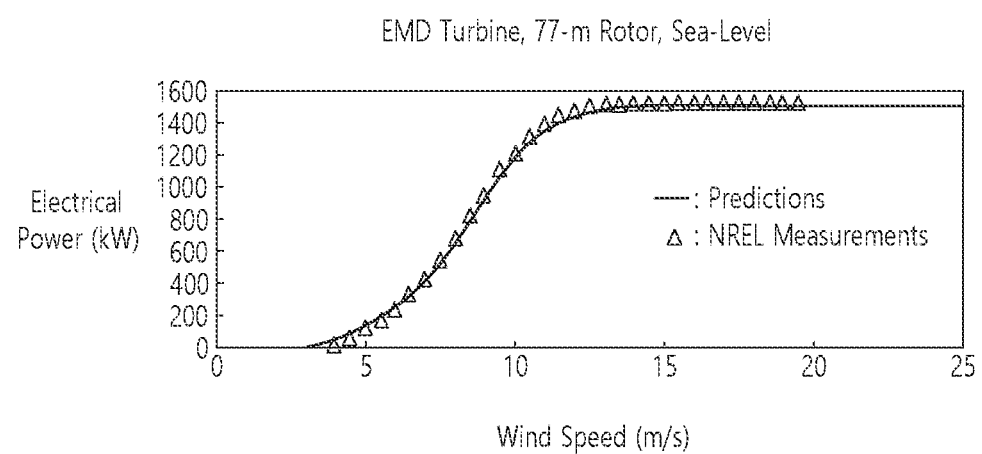
FIG. 23 illustrates a comparison result of the output of a conventional wind power generator and a wind power system according to an embodiment of the present disclosure.

FIG. 23 illustrates a comparison result of the output of a conventional wind power generator and a wind power system according to an embodiment of the present disclosure. In FIG. 23, the predicted power output is illustrated compared to a conventional wind power generator (NREL's EMD turbine installed in California, USA (rotor diameter 77 m)). In this regard, it may be understood that an individual turbine subjected to the tailwind, where the maximum output generates, shows similar or higher output compared to a general-purpose wind turbine. Moreover, it was found that the pressure loss related to the generation of noise was as small as 1/65 of a conventional general-purpose turbine (260 Pa, based on the maximum pressure loss) (Reference: Li et al., 2020, Renewable Energy).

As a result of the fluid dynamics analysis, in the case of an individual sail-shaped turbine and in the case of a wind direction close to the tailwind, an output similar to or superior to that of a conventional general-purpose wind turbine could be expected, but from the turbine's point of view along the rail, when the wind direction deviates from the tailwind and is changed to the wind direction of the headwind trend, there is a sharp decrease in output, and overall output is evaluated to be lower than that of the existing wind farm with the same installed capacity. However, when the maximum power is received through the rotation of the blade adaptively according to the direction of the wind according to an aspect of the present disclosure, it is expected that the output reduction issue will be solved.

In addition, the wind power system according to an embodiment of the present disclosure has fewer driving units compared to a conventional wind turbine, and has a simple structure, so that when a larger-scale turbine is used, additional output improvement can be expected. Moreover, the pressure loss directly related to the noise of wind power generation is $\frac{1}{65}$ (based on the maximum pressure loss) compared to a conventional wind turbine of the same scale, indicating that it has the strength of low-noise driving.

Hereinbefore, the embodiments of the present disclosure has been described with reference to the accompanying drawing, but the scope of protection of the present disclosure should not be construed as being limited to the drawings or embodiments. It will be understood by those skilled in the technical field that the present disclosure allows various modifications and variations without departing from the scope and spirit of the present disclosure as described in the claims below.

The above-described present disclosure has been described based on a series of functional blocks, but it is not limited by the above-described embodiment and attached drawings, and it is obvious to those skilled in the technical field to which the present disclosure pertains that embodiments may be substituted, modified, and changed in various ways within the scope of the technical ideas of the present disclosure.

The combination of the above-described embodiments is not limited to the above-described embodiments, and various forms of combinations as well as the above-described embodiments may be provided according to implementation and/or need.

In the above-described embodiments, methods are described based on a flowchart as a series of operations or blocks, but the present disclosure is not limited to the order of operations, and some operations may be performed in a different order or simultaneously. Further, those skilled in the technical field would understand that operations in the flowchart are not exclusive, another operation may be added, or one or more operations in the flowchart may be deleted without affecting the scope of the present disclosure.

The above-described embodiments include various forms of examples. It is not possible to describe all possible combinations for indicating various forms, but those skilled in the technical field would easily recognize the possibility of other combinations. Accordingly, it should be understood that the present disclosure includes all other substitutions, modifications, and changes within the scope of claims below.

What is claimed is:

1. A wind power system comprising:
   a rail for providing a movement path in a horizontal direction, the rail forming a loop;
   an inner loop formed inside the loop to provide a shorter movement path than the loop;
   a moving body configured to slide and move along the movement path of the rail;
   a plurality of blades installed on the moving body and configured to provide power for movement of the moving body based on energy from wind; and
   a nacelle having a generator for generating power by rotating in conjunction with the movement of at least one of the moving body and the blades,
   wherein the at least one of the moving body and the blades includes a surface facing the generator and a plurality of toothed threads formed in the surface,
   wherein the generator includes a circular toothed gear coupled to a generator central rotary shaft and is configured such that the generator central rotary shaft rotates as the toothed threads move in engagement with the circular toothed gear according to the movement of at least one of the moving body and the blades,
   wherein each of the plurality of blades is configured to adaptively rotate to maximize power in a target movement direction based on information on a wind direction and information on the target movement direction determined according to a position of each of the plurality of blades in the loop, and
   wherein the generator is configured to
      rotate in conjunction with the movement of at least one of the moving body and the blades of the loop, or the movement of at least one of the moving body and the blades of the inner loop,
      have a target rotation speed based on information on a wind speed, and
      selectively rotate in conjunction with either of the loop movement or the inner loop movement so that the generator has a rotation speed that is closer to the target rotation speed.

2. The wind power system of claim 1, further comprising a power transfer shaft that rotates in conjunction with the movement of at least one of the moving body and the blades,
   wherein a rotation pulley provided on the power transfer shaft and a rotation pulley provided on the generator central rotary shaft of the generator are configured to rotate in conjunction with a rotating belt.

3. The wind power system of claim 1, wherein rotation of each of the plurality of blades is performed based on a rotary shaft perpendicular to the ground.

4. The wind power system of claim 1, wherein each of the plurality of blades is configured of a flexible material to be deformed into a shape that maximizes power in a target movement direction by controlling an air filling amount for at least one blade among the plurality of blades based on information on a wind direction and information on the target movement direction determined according to a position of each of the plurality of blades in the loop.

5. The wind power system of claim 1, wherein the information on a position of each of the plurality of blades in the loop is acquired by receiving a position identification signal from each of the plurality of blades.

6. The wind power system of claim 1, wherein the information on a wind direction is acquired from each of the plurality of blades.

7. The wind power system of claim 1, wherein:
   each of the plurality of blades is configured to rotate in a direction to perform leeward sailing, in response to a determination that the target movement direction coincides with a wind direction; and
   each of the plurality of blades is configured to rotate in a direction to perform windward sailing, in response to a determination that the target movement direction is opposite to the wind direction.

8. The wind power system of claim 1, wherein:
   each of the plurality of blades is divided in a height direction to have a first partial blade and a second partial blade;
   the first partial blade and the second partial blade are configured to be rotatable independently of each other; and
   the first partial blade and the second partial blade are configured to adaptively rotate to maximize power in the target movement direction determined according to the loop position of a corresponding blade of the plurality of blades, the power being maximized based on information on a wind direction occurring at respective heights corresponding to the first partial blade and a second partial blade.

9. The wind power system of claim 1, wherein the loop formed by the rail comprises:
   a first portion for providing a movement path in a first direction;
   a second portion for providing a movement path in a second direction opposite to the first direction;
   a first joint portion for providing a movement path from the first portion to the second portion; and
   a second joint portion for providing a movement path from the second portion to the first portion.

10. The wind power system of claim 1, wherein the information on a wind speed is acquired from a wind speed sensor.

11. The wind power system of claim 1, wherein each of the plurality of blades is configured to have an installation position that is changed with respect to the moving body along the movement path of the rail.

12. The wind power system of claim 11,
   wherein the plurality of blades includes a first group of blades and a second group of blades, the first group of blades separated from each other by a first interval, the second group of blades separated from each other by a second interval narrower than the first interval, and
   wherein the rail includes a straight section in which the first group of blades are arranged and the second group of blades are not arranged and a curved section in which the second group of blades are arranged and the first group of blades are not arranged.

13. The wind power system of claim 1, further comprising:
   a housing unit in which the plurality of blades can be housed;
   a junction included in the rail; and
   a housing rail for providing a movement path from the junction to the housing unit,
   wherein the plurality of blades are configured to be housed in the housing unit via the junction and the housing rail.

14. The wind power system of claim 1, further comprising:
   a housing unit disposed along the rail,
   wherein the rail is configured to pass through the housing unit, and
   wherein the plurality of blades are configured to be housed in the housing unit by moving along the rail.

15. The wind power system of claim 11,
   wherein the plurality of blades is further configured to occupy a minimized space along the movement path of the rail by minimizing an interval between the plurality of blades, and
   wherein each of the plurality of blades comprises a fastening unit for coupling one blade of the plurality of blades with a blade adjacent to the one blade, when the interval between the plurality of blades is minimized by changing an installation position with respect to the moving body.

16. The wind power system of claim 15, wherein:
   the plurality of blades comprise a first blade positioned on a leftmost side and a second blade positioned on a rightmost side when the interval is minimized;
   the first blade and the second blade each have a fastening unit; and
   the plurality of blades are coupled by fastening the first blade and the second blade to each other.

17. The wind power system of claim 1, wherein each of the plurality of blades is configured to be foldable between a normal position in which the blades are arranged vertically and a ground adjacent position in which the blades are arranged to be parallel to a ground direction, the ground adjacent position achieved after folding.

* * * * *